United States Patent
Kuboki et al.

(10) Patent No.: US 10,332,678 B2
(45) Date of Patent: Jun. 25, 2019

(54) POWER STORAGE MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Makoto Higashikozono, Yokkaichi (JP); Kenji Nakagawa, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/764,252

(22) PCT Filed: Sep. 28, 2016

(86) PCT No.: PCT/JP2016/078557
§ 371 (c)(1),
(2) Date: Mar. 28, 2018

(87) PCT Pub. No.: WO2017/061311
PCT Pub. Date: Apr. 13, 2017

(65) Prior Publication Data
US 2018/0261387 A1 Sep. 13, 2018

(30) Foreign Application Priority Data
Oct. 5, 2015 (JP) .................... 2015-197578

(51) Int. Cl.
  *H05K 7/00* (2006.01)
  *H01G 2/04* (2006.01)
  (Continued)

(52) U.S. Cl.
  CPC ............... *H01G 2/04* (2013.01); *H01G 11/10* (2013.01); *H01G 11/16* (2013.01); *H01G 11/78* (2013.01);
  (Continued)

(58) Field of Classification Search
  CPC ........ H01G 11/10; H01G 11/16; H01G 11/78; H01G 2/04; H01M 10/44; H01M 10/48;
  (Continued)

(56) References Cited

U.S. PATENT DOCUMENTS

2010/0124693 A1  5/2010 Kosuhi
2011/0106280 A1* 5/2011 Zeier .................... H01M 10/42
                                               700/90
(Continued)

FOREIGN PATENT DOCUMENTS

JP  2008288077 A  11/2008
JP  2009289430 A  12/2009
(Continued)

OTHER PUBLICATIONS

International Search Report for Application No. PCT/JP2016/078557 dated Dec. 6, 2016; 5 pages.

*Primary Examiner* — Yuriy Semenenko
(74) *Attorney, Agent, or Firm* — Reising Ethington, P.C.

(57) ABSTRACT

A power storage module includes: a power storage unit with a plurality of power storage elements; and a circuit unit attached to the power storage unit. The circuit unit includes: a high-current member through which a composite current obtained from the plurality of power storage elements flows; a low-current member through which a detection current for
(Continued)

detecting a state of the individual power storage elements flows; and a lower case and an upper case that hold the high-current member and the low-current member.

6 Claims, 33 Drawing Sheets

(51) Int. Cl.
| | | |
|---|---|---|
| H01G 11/10 | (2013.01) | |
| H01M 2/10 | (2006.01) | |
| H01M 2/20 | (2006.01) | |
| H01M 10/44 | (2006.01) | |
| H01M 10/48 | (2006.01) | |
| H01G 11/16 | (2013.01) | |
| H01G 11/78 | (2013.01) | |

(52) U.S. Cl.
CPC ............... *H01M 2/10* (2013.01); *H01M 2/20* (2013.01); *H01M 2/206* (2013.01); *H01M 10/44* (2013.01); *H01M 10/48* (2013.01); *H01M 10/482* (2013.01); *H01M 2220/20* (2013.01); *Y02E 60/13* (2013.01); *Y02T 10/7022* (2013.01)

(58) Field of Classification Search
CPC ................ H01M 10/482; H01M 2220/20; H01M 2/10; H01M 2/20; H01M 2/206; Y02E 60/13; Y02T 10/7022
See application file for complete search history.

(56) References Cited

U.S. PATENT DOCUMENTS

| | | | | |
|---|---|---|---|---|
| 2011/0248719 A1* | 10/2011 | Aoki | ................... | H01M 10/482 324/426 |
| 2013/0029201 A1* | 1/2013 | Motohashi | ............ | H01M 2/204 429/130 |
| 2014/0079960 A1* | 3/2014 | Yun | .......................... | H02J 7/34 429/7 |
| 2015/0069829 A1* | 3/2015 | Dulle | ..................... | B60R 16/03 307/9.1 |

FOREIGN PATENT DOCUMENTS

| | | | |
|---|---|---|---|
| JP | 2014013722 | * | 1/2014 |
| JP | 2014013722 A | | 1/2014 |
| JP | 2015138604 A | | 7/2015 |

* cited by examiner

*Figure 1*
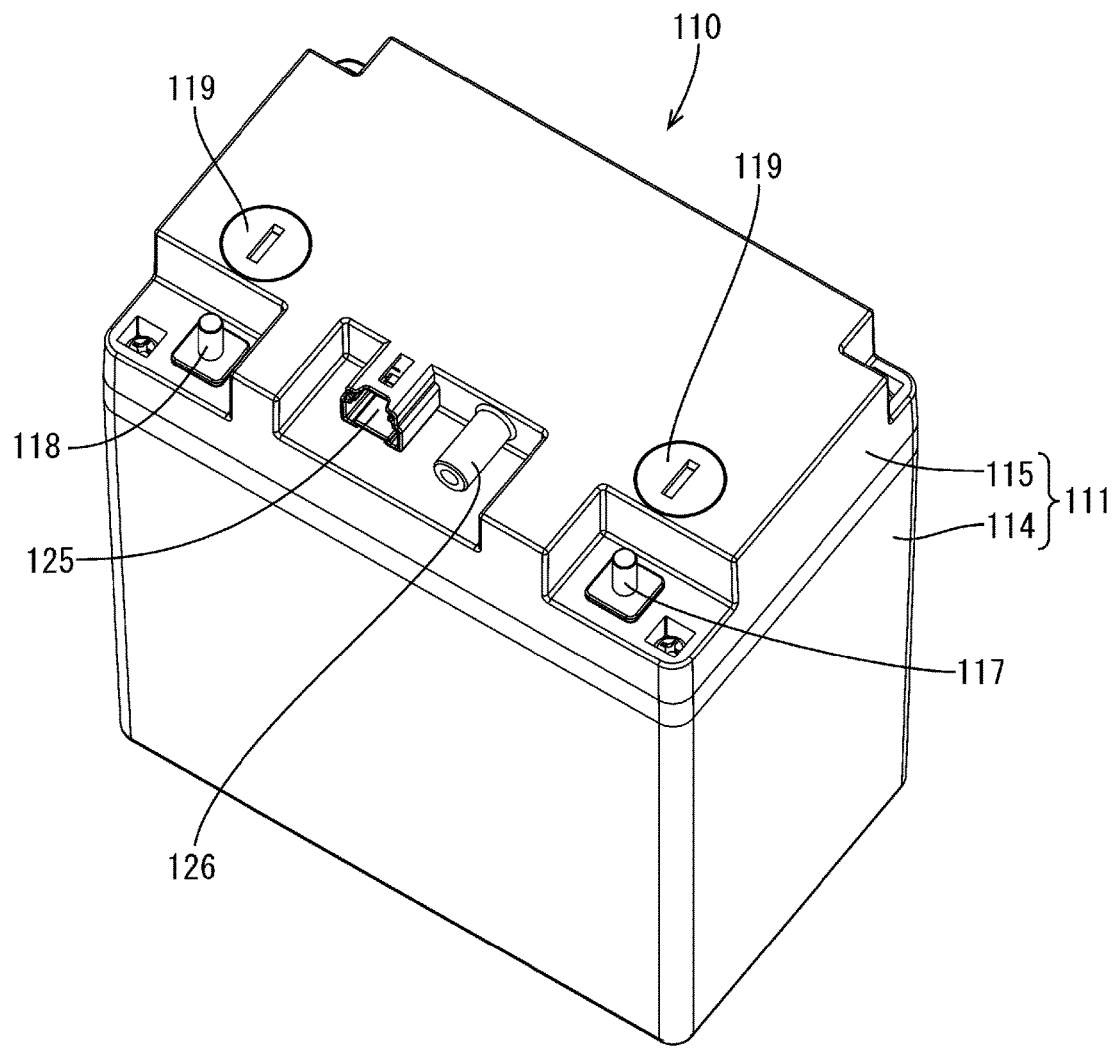
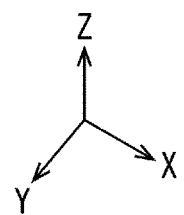

Figure 3
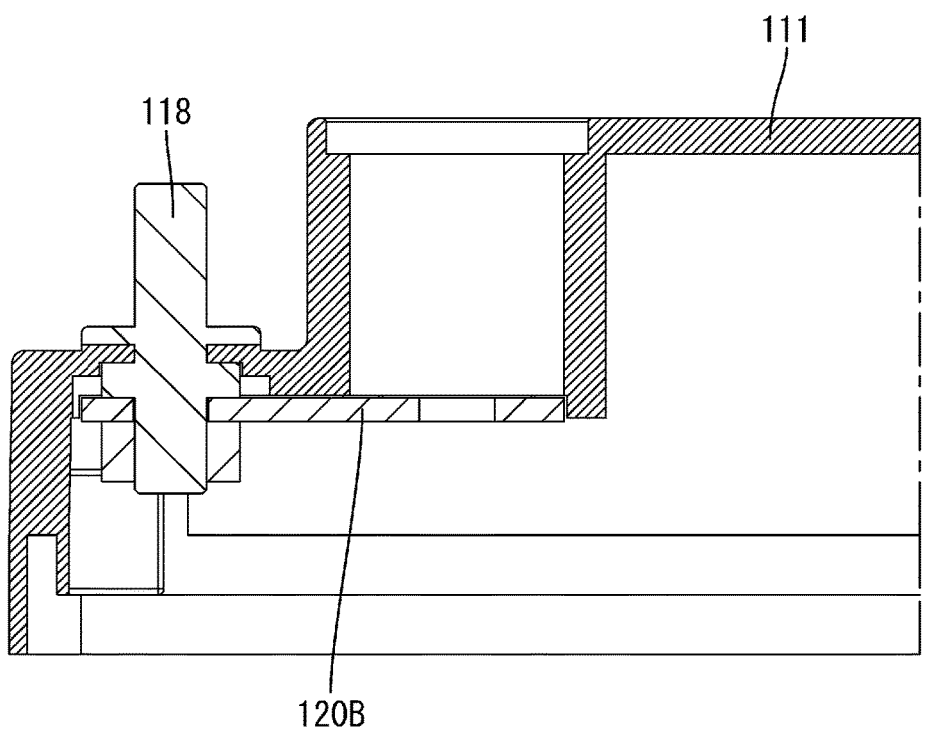
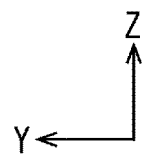

POWER STORAGE MODULE

CROSS REFERENCE TO RELATED APPLICATIONS

This application claims the priority of Japanese patent application JP2015-197578 filed on Oct. 5, 2015, the entire contents of which are incorporated herein.

TECHNICAL FIELD

The technique disclosed in the present description relates to a power storage module.

BACKGROUND ART

Patent Document 1 (JP 2013-106400A) describes a power storage module in which a wiring module is attached to an electric cell group in which a plurality of electric cells are lined up. The wiring module includes detection wires connected to the respective electric cells to detect a state of the electric cells. With this, the electric cell group and the detection wires are combined into a single device.

SUMMARY

However, according to the above-described configuration, the detection wires and power supply wires are derived from the cells and are then arranged separately in the wiring module. Accordingly, the wiring space around the cells is large, causing the problem that the entire power storage module is large.

The technique disclosed in the present description was made in view of the above-described circumstances, and it is an object thereof to provide a downsized power storage module.

According to the technique disclosed in the present description, a power storage module includes: a power storage unit with a plurality of power storage elements; and a circuit unit attached to the power storage unit, wherein the circuit unit includes: a high-current member through which a composite current obtained from the plurality of power storage elements flows; a low-current member through which a detection current for detecting a state of the individual power storage elements flows; and a circuit holding member that holds the high-current member and the low-current member.

According to the present configuration, the power storage unit and the circuit unit are combined into a single device, and the high-current member and the low-current member are held in one piece by the circuit holding member, thus making it possible to downsize the power storage module as a whole.

The following aspects are preferable as embodiments of the present configuration.

Preferably, the circuit unit may be attached to the power storage unit along one face of the power storage unit and another face that extends from an edge of the one face.

According to the above-described configuration, since the circuit unit is arranged along one face and the other side of the power storage unit, it is possible to further downsize the power storage module.

Preferably, the low-current member may be interposed between the power storage elements and the high-current member.

Since a composite current flows through the power storage unit, and the high-current member of the circuit unit, it is concerned that heat is generated due to the current flow, and the temperature of the casing increases locally in the vicinity of the power storage unit and the high-current member. According to the above-described configuration, the low-current member is interposed between the power storage elements and the high-current member. Therefore, the power storage unit and the high-current member are arranged apart from each other, thus suppressing a local increase in the temperature of the casing.

Preferably, the circuit holding member may include: an insulating first case arranged covering a face of the power storage unit; and an insulating second case arranged covering a face of the first case opposite to its face covering the power storage unit, and the low-current member may be arranged between the first case and the second case.

According to the above-described configuration, the low-current member is reliably insulated by the first case and the second case.

Preferably, the power storage unit may be provided with a standby connection part connected to the low-current member; and a guide part that is formed in the vicinity of the standby connection part, and is configured to guide the circuit unit to a true mounting position.

According to the above-described configuration, it is possible to improve the work efficiency when assembling the power storage unit and the circuit unit together.

Preferably, the high-current member may include a high current path serving as a path through which the composite current flows, and a relay configured to switch supply and shutoff of the composite current.

According to the above-described configuration, as a result of the relay being incorporated as the circuit unit, the need of providing a separate electrical junction box with a relay is eliminated. Accordingly, it is possible to arrange the components included in the power storage module compactly as a whole.

Preferably, the high-current member may include a high current path serving as a path through which the composite current flows, and a fuse connected to the high current path.

According to the above-described configuration, as a result of the fuse being incorporated as the circuit unit, the need of providing a separate fuse box in which a fuse is installed is eliminated. Accordingly, it is possible to arrange the components included in the power storage module compactly as a whole. Moreover, it is possible to take overcurrent protection at a position close to the power storage unit.

Preferably, the circuit unit may include a state detecting part configured to detect a state of the power storage elements upon input of a detection current flowing through the low-current member.

According to the above-described configuration, it is possible to downsize the power storage module as a whole compared to a case where a separate state detecting part is provided.

According to the technique disclosed in the present description, it is possible to downsize a power storage module

BRIEF DESCRIPTION OF DRAWINGS

FIG. 1 is a perspective view illustrating a power storage module according to Embodiment 1.

FIG. 3 is a cross-sectional view taken along a line L-L in FIG. 2.

DESCRIPTION OF EMBODIMENTS

Embodiment 1

Figure 2:
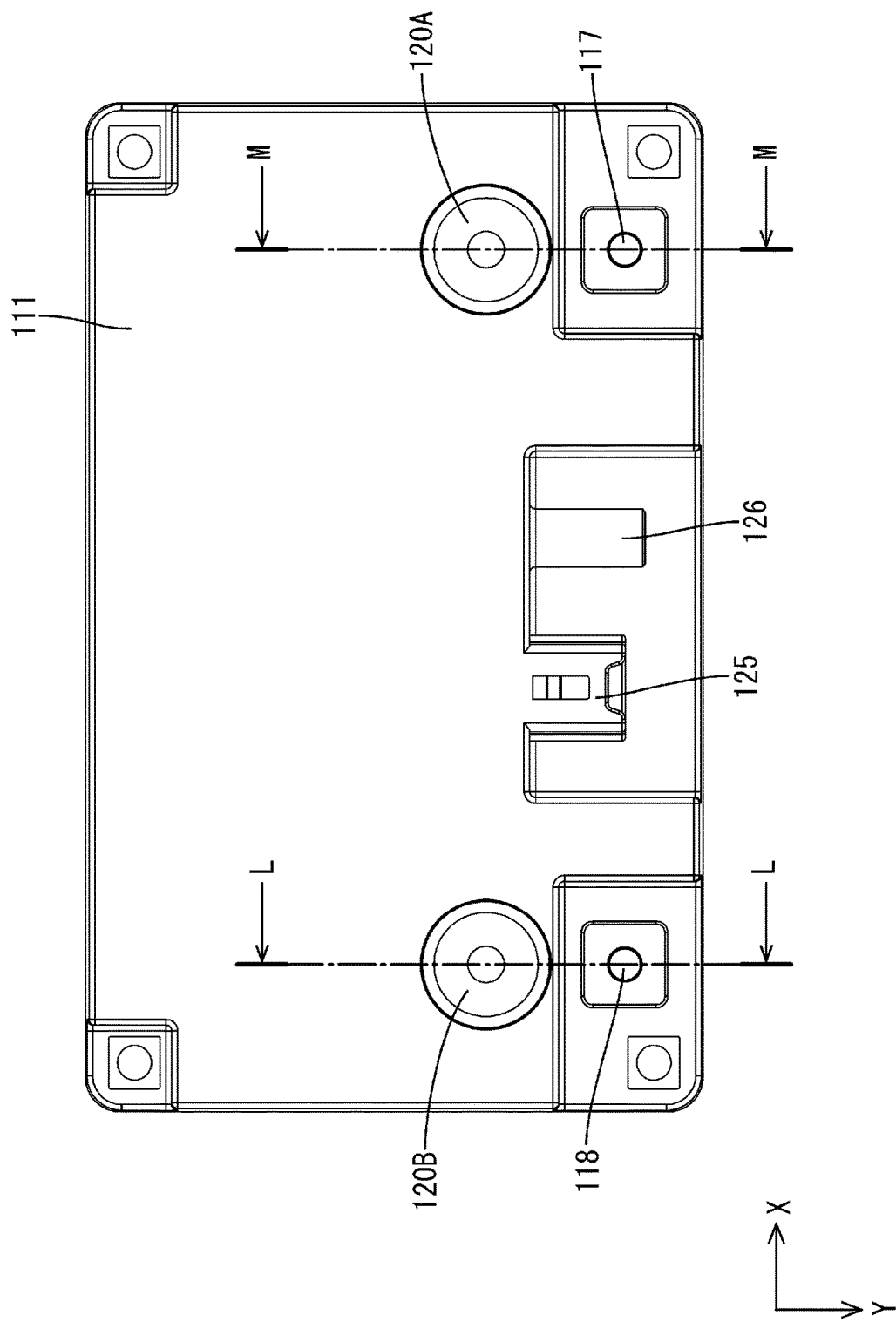
FIG. 2 is a plan view illustrating the power storage module.
Figure 4:
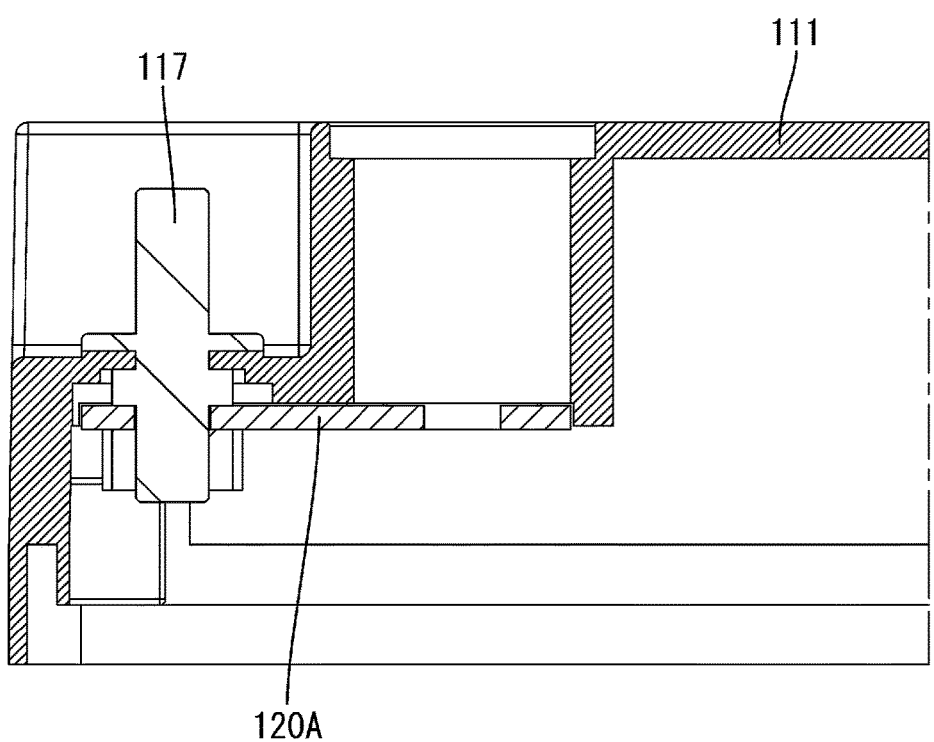
FIG. 4 is a cross-sectional view taken along a line M-M in FIG. 2.
Figure 5:
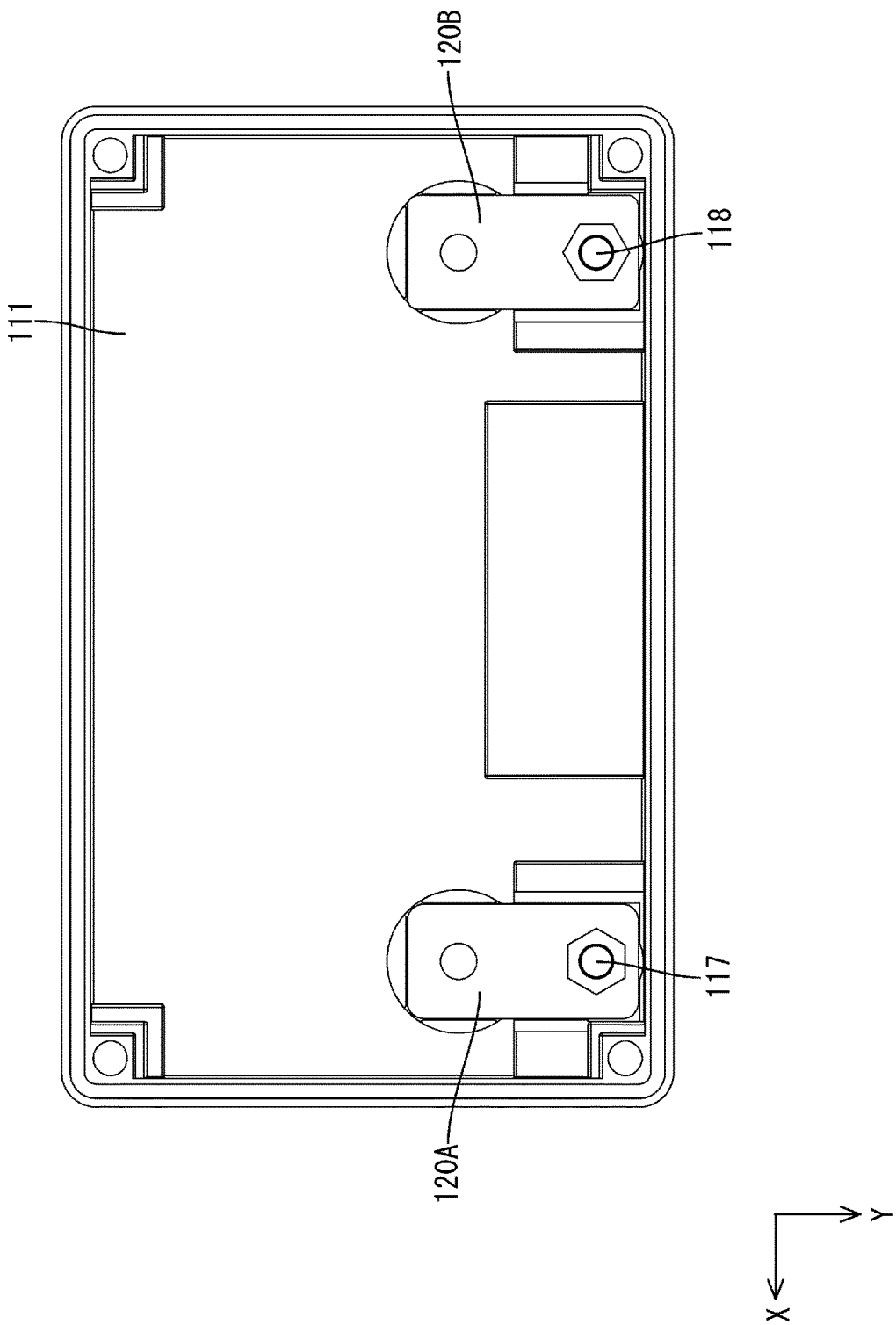
FIG. 5 is a bottom view illustrating a lid.
Figure 6:
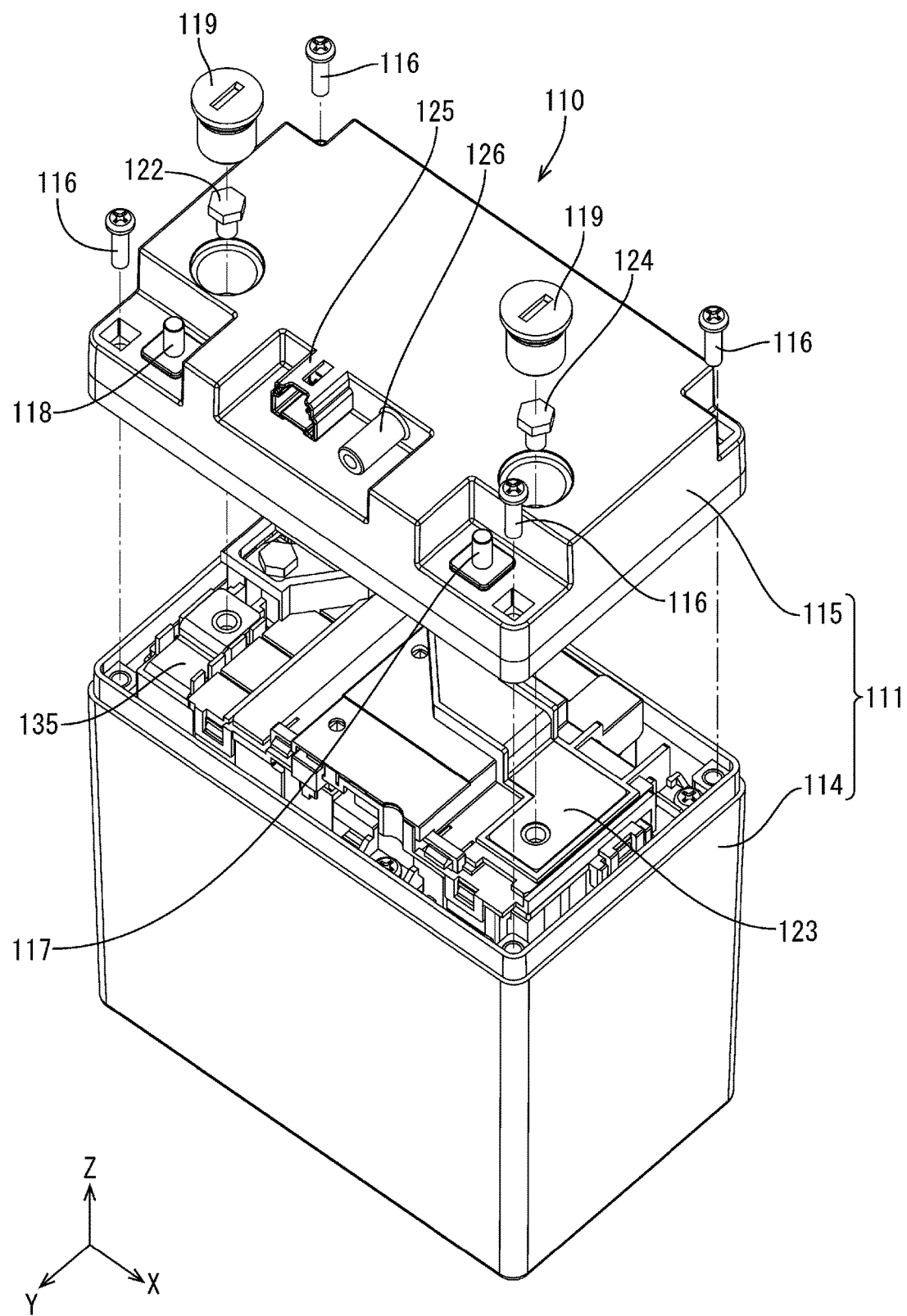
FIG. 6 is an exploded perspective view illustrating the power storage module.
Figure 7:
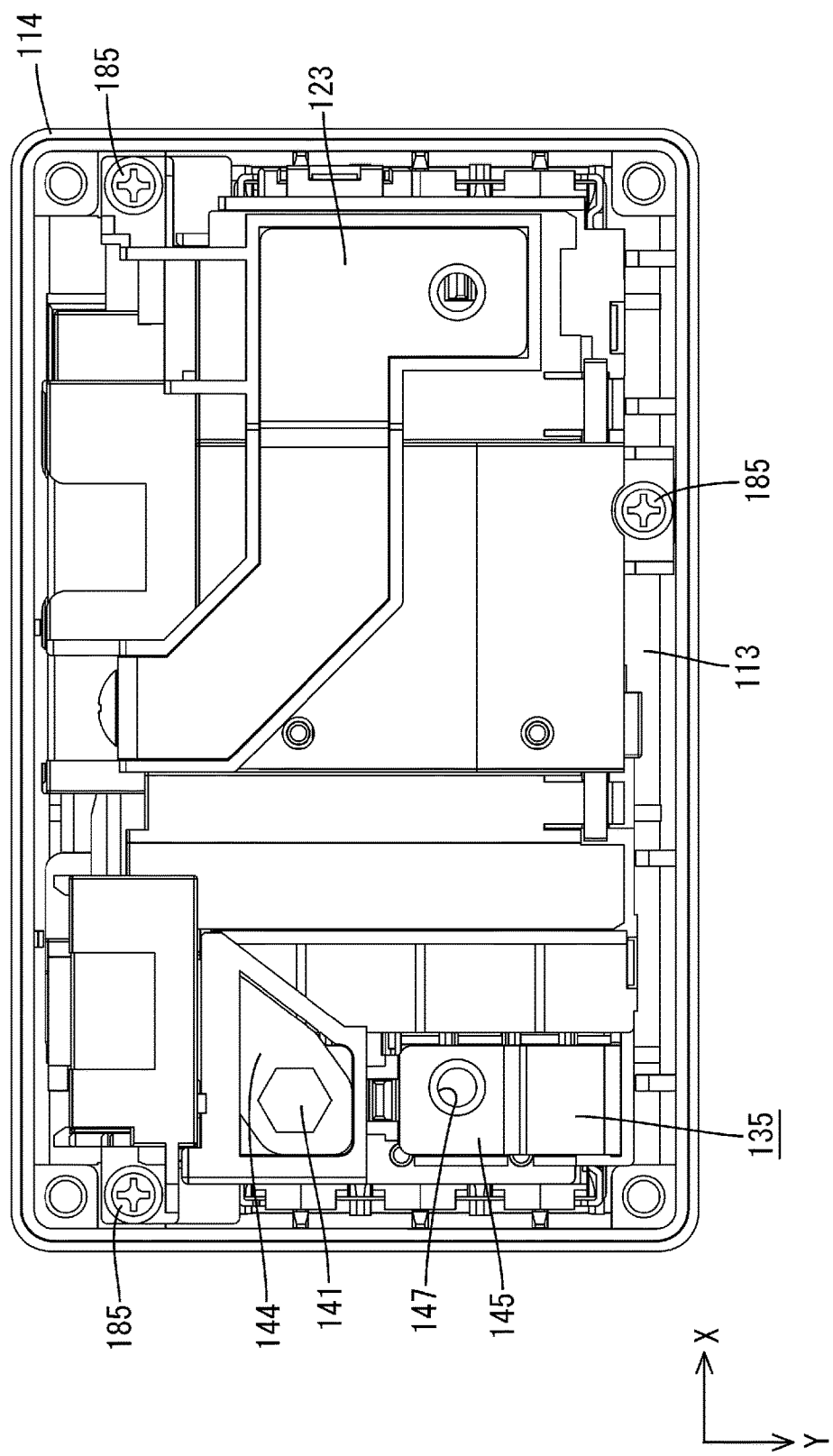
FIG. 7 is a plan view illustrating the power storage module in a state in which the lid is removed.

Embodiment 1 according to the technique disclosed in the present description will be explained with reference to FIGS. 1 to 33. A power storage module 110 according to the present embodiment is installed in a not-shown vehicle, and is used as a power supply. The power storage module 110 is provided with, in its casing 111, a power storage unit 112 and a circuit unit 113. In the following description, the X direction refers to a "right" direction, the Y direction refers to a "front" direction, and the Z direction refers to an "up" direction. Furthermore, there may be cases where reference signs are given to some of a plurality of the same members, and are not given to the remaining members.

The casing 111 as a whole has the shape of a rectangular parallelepiped (see FIG. 1). The casing 111 includes a case 114 that is open upward, and a lid 115 that is attached to the case 114 to close the opening (see FIG. 6). The opening of the case 114 is rectangular when viewed from above. The ceiling wall of the lid 115 has a shape that corresponds to the opening of the case 114. The lid 115 is fixed to the case 114 with bolts 116 arranged at the four corners of the lid 115. The lid 115 and the case 114 may also be glued to each other or may be thermally fused and bonded to each other.

The shape of the casing 111 may comply with the standard for lead storage batteries for automobiles or may differ from the standard, that is, the casing 111 may have any shape as appropriate.

The case 114 and the lid 115 are made of insulating synthetic resin. The synthetic resin of which the case 114 is made and the synthetic resin of which the lid 115 is made may be of the same type or of different types.

A positive terminal 117 is arranged on the front right end portion of the upper surface of the lid 115, and a negative terminal 118 is arranged on the front left end portion of the upper surface of the lid 115 (see FIG. 2). The positive terminal 117 and the negative terminal 118 have the shape of a bolt protruding upward.

Caps 119 are respectively arranged at positions slightly behind the positive terminal 117 and the negative terminal 118 on the upper surface of the lid 115. The caps 119 may be provided watertightly in the lid 115. Below the caps 119, relay busbars 120A and 120B respectively connected to the positive terminal 117 and the negative terminal 118 extend rearward (see FIGS. 3 to 5). The relay busbar 120A (an example of a high current path), which is connected to the positive terminal 117, is fixed to a later-described second high-current busbar 123 (an example of the high current path) with a bolt 122, and the relay busbar 120B (an example of the high current path), which is connected to the negative terminal 118, is fixed to a later-described negative terminal busbar 135 with a bolt 124. The caps 119 keep water or dirt from entering the inside of the lid 115.

A connector 125, which is open to the front, is provided at a position between the positive terminal 117 and the negative terminal 118 on the upper side of the lid 115. An external circuit-side connector (not shown) connected to an external circuit can be fitted to the connector 125. The external circuit-side connector is connected to a not-shown ECU (Electronic Control Unit).

An exhaust port 126 in the shape of a tube extending to the front is formed on the right side of the connector 125. A not-shown pipe can be attached to this exhaust port 126. The pipe is in communication with the outside of the vehicle, and is configured to guide the gas discharged from power storage elements 127, which will be described later, to the outside of the vehicle.

The power storage unit 112 and the circuit unit 113 are accommodated in the case 114 in their assembled state. The circuit unit 113 is fixed to the case 114 with bolts 185 (see FIG. 7).

Figure 8:
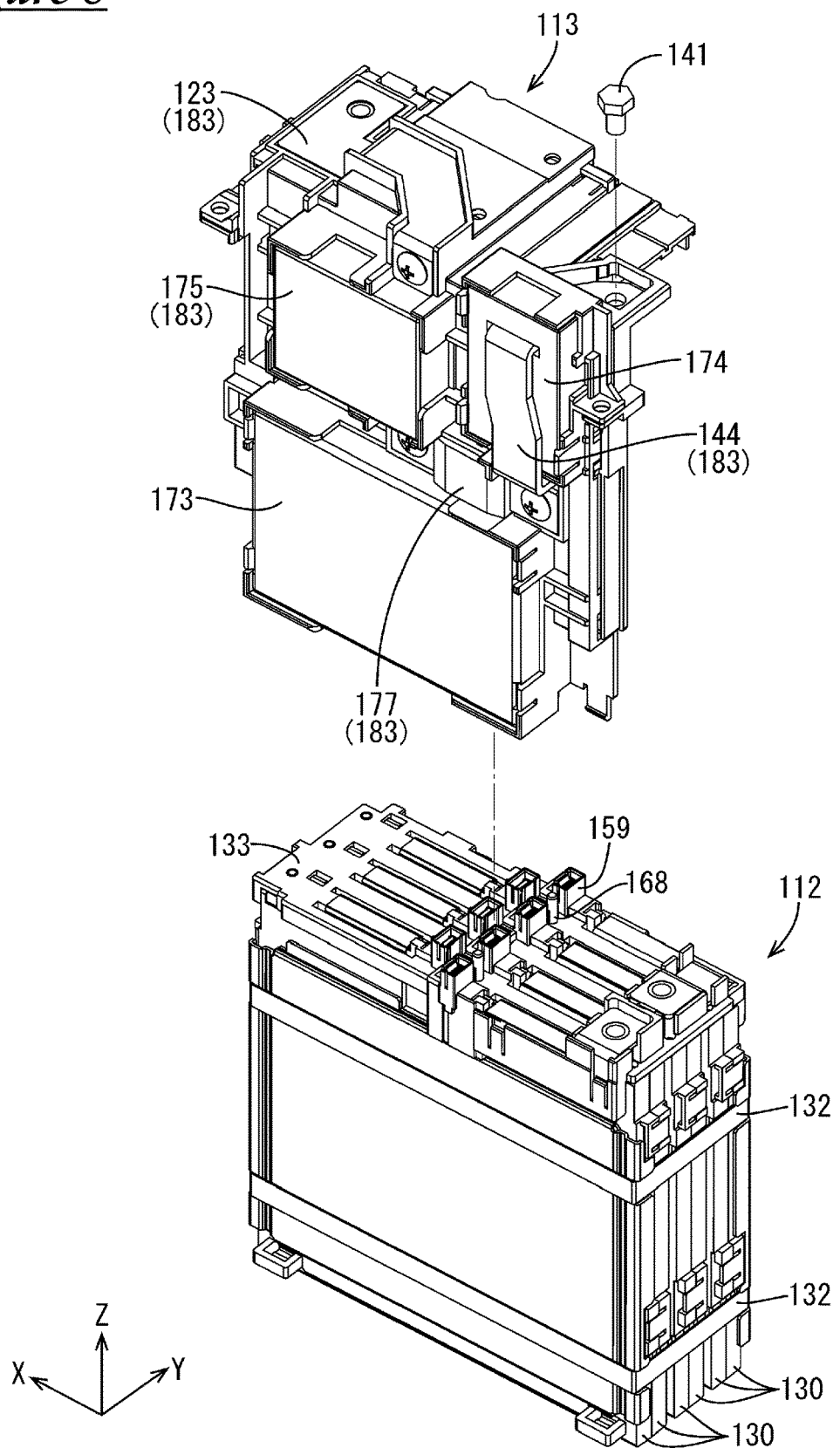
FIG. 8 is an exploded perspective view illustrating a circuit unit and a power storage unit.

The power storage unit 112 as a whole has the shape of a substantially rectangular parallelepiped (see FIG. 8). The power storage unit 112 includes a power storage element group 128 in which a plurality of (six in the present embodiment) power storage elements 127 are lined up (see FIG. 10). Each power storage element 127 has a power storage component (not shown) sandwiched between a pair of rectangular laminate sheets. The pair of laminate sheets are joined to each other on their four sides in a state in which the power storage component is accommodated in the inner space therebetween. The sides of the pair of laminate sheets are joined to each other by a well-known method, such as thermal fusion bonding, gluing, or the like.

The power storage element 127 is provided with, on its upper edge, a pair of tabs 129 protruding upward. One of the tabs 129 is a positive electrode tab 129A, and the other one is a negative electrode tab 129B. The tabs 129 are made of metallic foil. Any metal such as aluminum, an aluminum alloy, copper, or a copper alloy may be used as appropriate for the metal of which the tabs 129 are made. The tabs 129 according to the present embodiment are made of copper or a copper alloy. The surfaces of the tabs 129 may also be provided with a plated layer made of metal such as tin or nickel.

Figure 9:
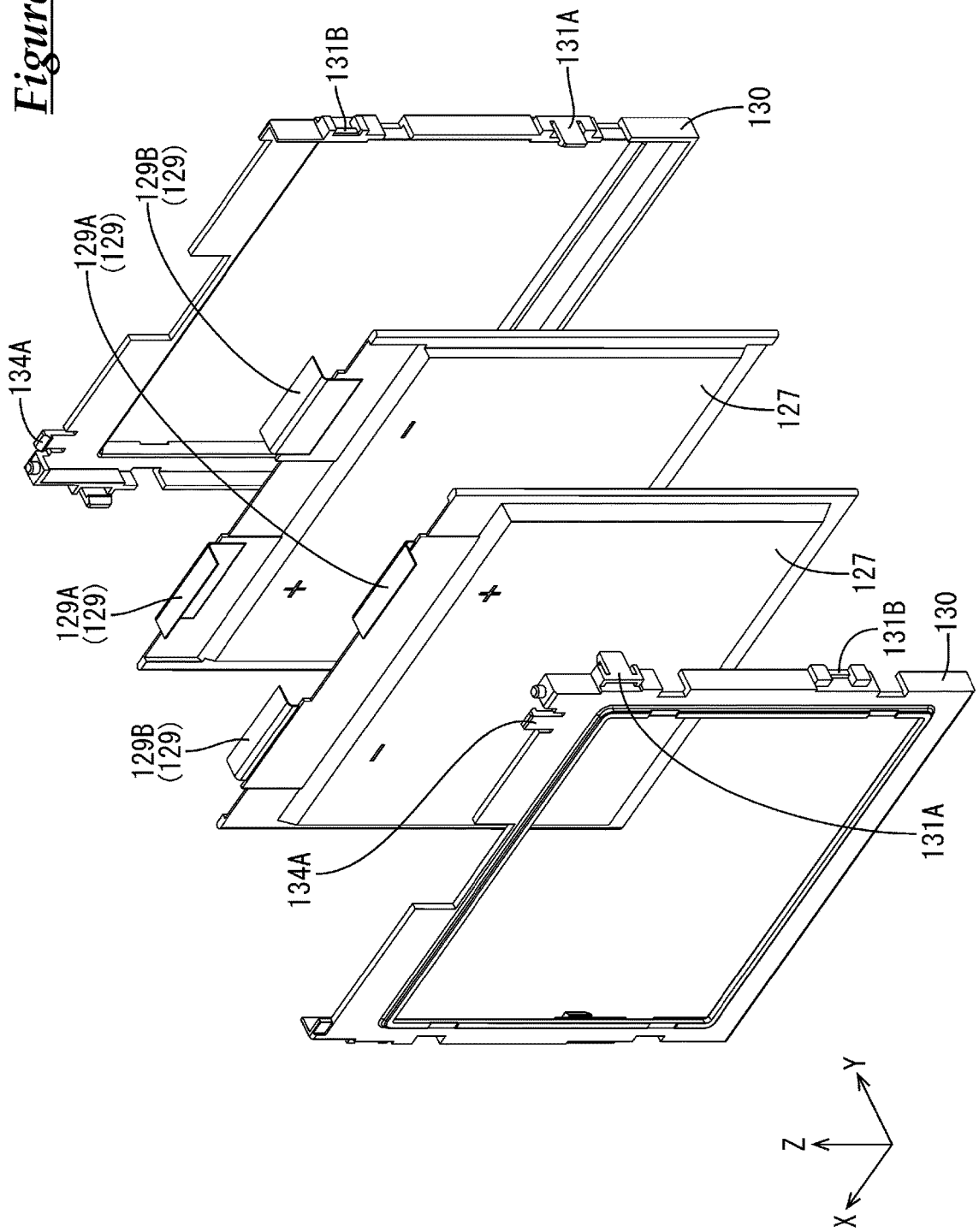
FIG. 9 is an exploded perspective view illustrating frame parts and power storage elements.
Figure 10:
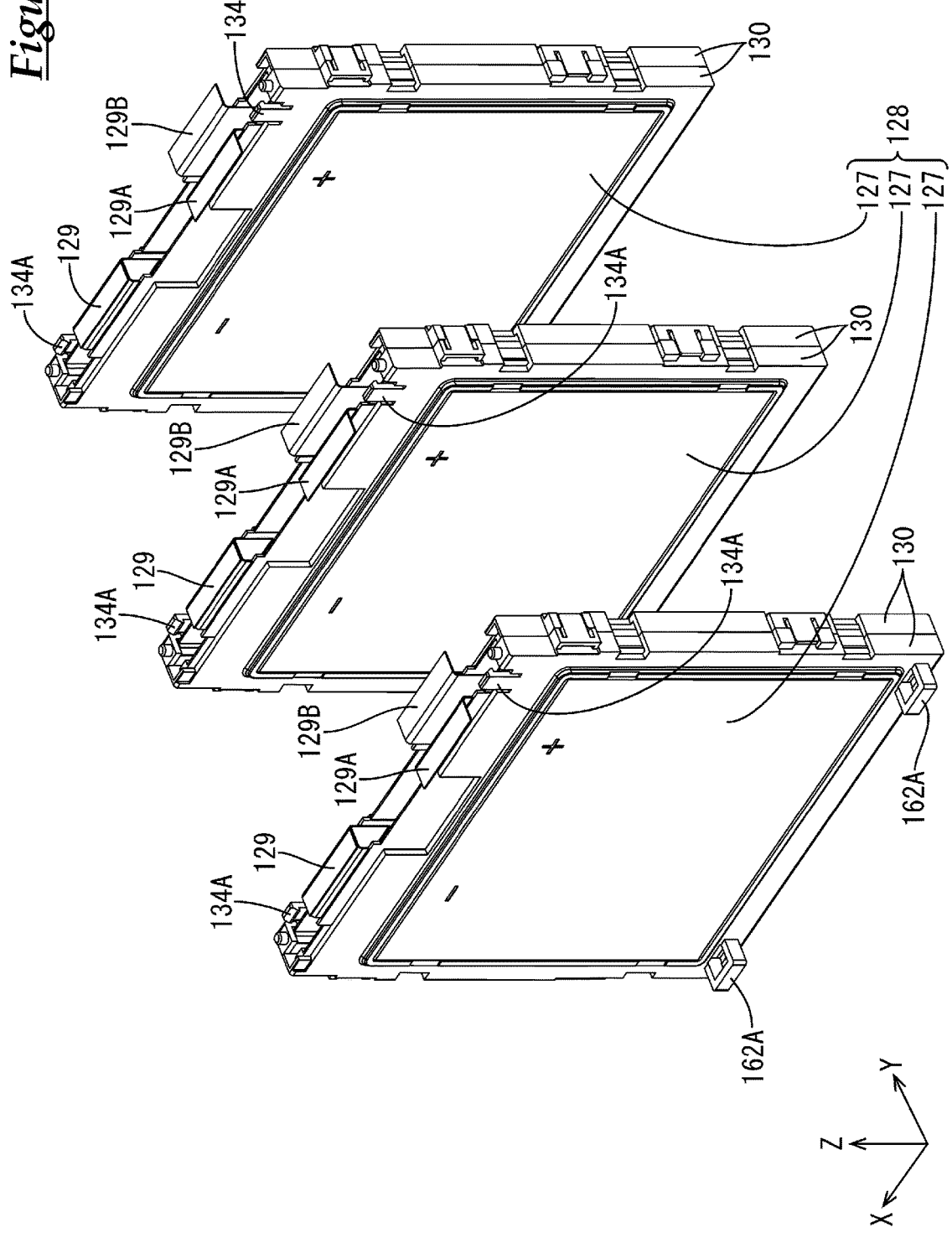
FIG. 10 is a perspective view illustrating the power storage elements sandwiched by the frame parts.
Figure 11:
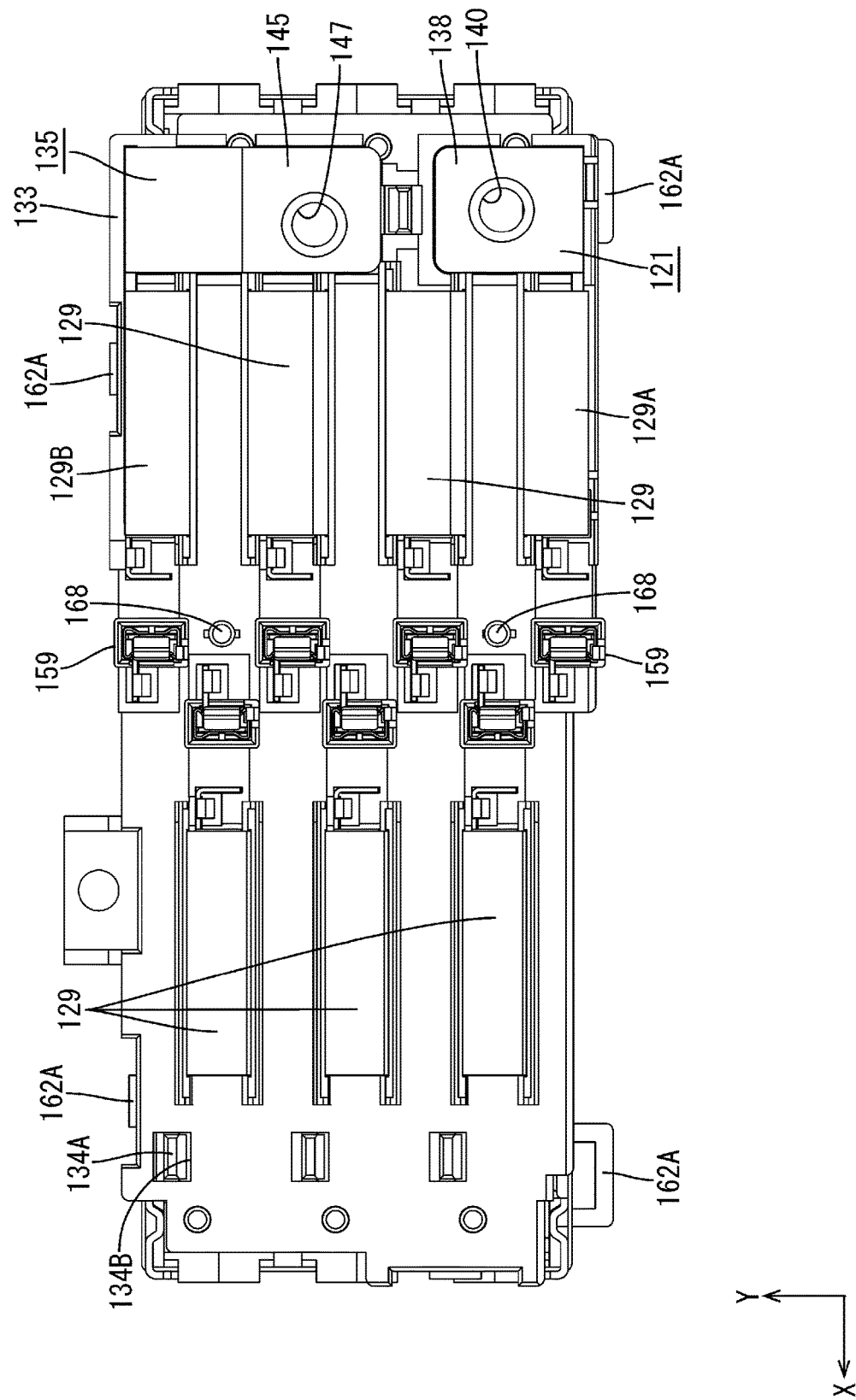
FIG. 11 is a plan view illustrating the power storage unit.

Two power storage elements 127 are sandwiched and held between a pair of frames 130 made of an insulating synthetic resin in a state in which they are lined up so that their adjacent tabs 129 have different polarities (see FIG. 9). The frames 130 each have the shape of a rectangle that has, in its central portion, a space in which the power storage element 127 is accommodated. The frames 130 are provided with, at their left and right edges, lock parts 131A and lock receiving parts 131B, which are elastically engaged with each other. The pair of frames 130 are configured to be assembled into a single piece by elastically engaging the lock parts 131A with the lock receiving parts 131B.

The one of the two tabs 129 of each power storage element 127 that is located on the right side is bent at a right angle in the front-rear direction, so that the tabs located on the right side are connected to each other while overlapping each other. The tabs 129 are connected to each other by a well-known method such as laser welding, ultrasonic welding, resistance welding, soldering, or brazing.

Three pairs of power storage elements 127 that are put together by the frames 130 are lined up and are bundled by two binding members 132 arranged on the upper and lower sides. The binding members 132 are constituted by annular belts made of metal or synthetic resin. Three pair of power storage elements 127 are put together into one piece as a result of the binding members 132 being fitted externally (see FIG. 8).

The six power storage elements 127 are lined up so that their adjacent tabs 129 have different polarities. The one of the two tabs 129 of each power storage element 127 that is located on the left side is connected to a tab 129 of another pair of power storage elements 127 that is lined up so as to be adjacent thereto. The tabs 129 are connected to each other by a well-known method such as laser welding, ultrasonic welding, resistance welding, soldering, or brazing.

An insulating protector 133 made of an insulating synthetic resin is attached to the upper portion of the plurality of power storage elements 127 bundled together by the binding members 132. The insulating protector 133 is a substantially rectangular-shaped plate when viewed from above (see FIG. 11).

The frames 130 and the insulating protector 133 are assembled, as a result of lock parts 134A formed at the upper ends of the frames 130 being elastically engaged with lock receiving parts 134B formed at the positions on the insulating protector 133 that correspond to the lock parts 134A.

Figure 12:
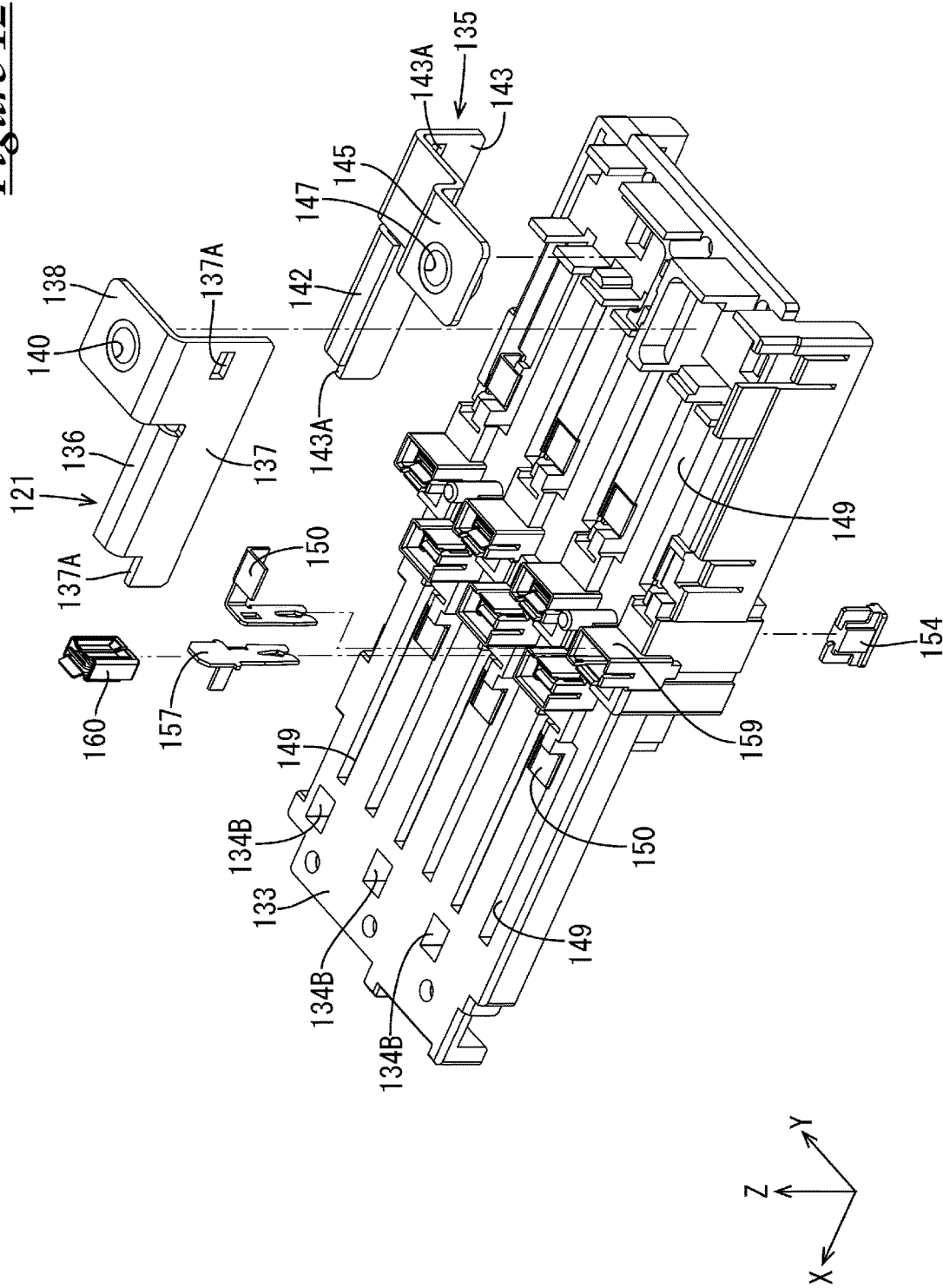
FIG. 12 is an exploded perspective view illustrating an insulating protector and the electric connection structure of the power storage unit.
Figure 13:
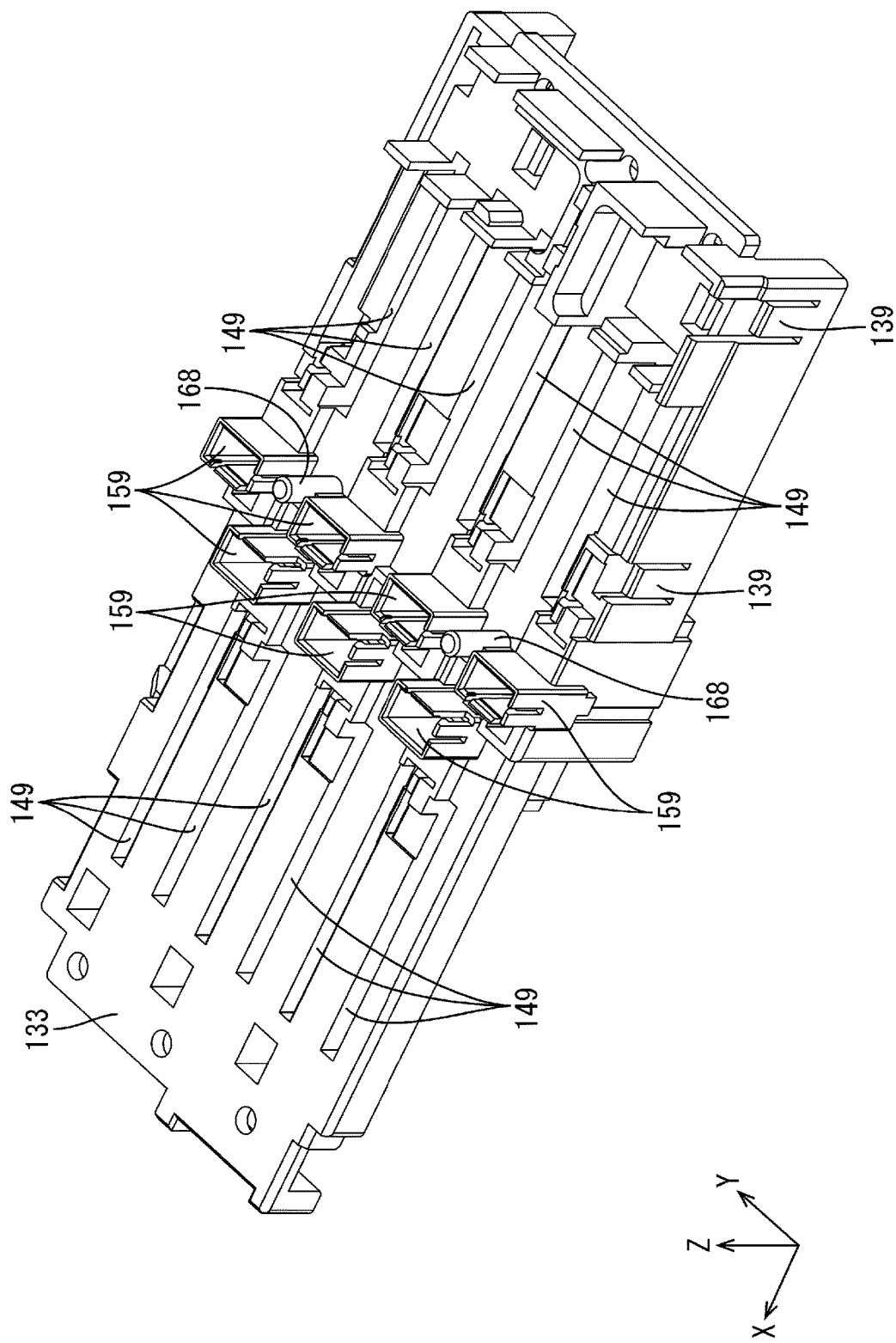
FIG. 13 is a perspective view illustrating the insulating protector.

The insulating protector 133 is provided with a positive electrode busbar 121 that is connected to the positive electrode tab 129A of the power storage element 127, and a negative electrode busbar 135 that is connected to the negative electrode tab 129B of the power storage element 127 (see FIG. 12). The positive electrode busbar 121 and the negative electrode busbar 135 are obtained by pressing metal plate materials into predetermined shapes. Any metal such as copper, a copper alloy, aluminum, or an aluminum alloy may be suitably selected as appropriate for the metal of which the positive electrode busbar 121 and the negative electrode busbar 135 are made. In the present embodiment, the positive electrode busbar 121 and the negative electrode busbar 135 are made of copper or a copper alloy. The surfaces of the positive electrode busbar 121 and the negative electrode busbar 135 may also be provided with a plated layer made of tin, nickel, or the like.

The positive electrode busbar 121 has: a positive electrode tab connecting portion 136 that is connected to the positive electrode tab 129A of the power storage element 127, and extends in the left-right direction; a held portion 137 that extends downward from the positive electrode tab connecting portion 136, and is held by the insulating protector 133; and a positive electrode terminal connecting portion 138 that is provided at a position close to the left end of the held portion 137, is bent frontward, and is connected to a first high-current busbar 144 (an example of high current paths).

The positive electrode tab 129A and the positive electrode tab connecting portion 136 are connected to each other by a well-known method such as laser welding, ultrasonic welding, soldering, or brazing. In the present embodiment, they are connected to each other by laser welding.

The held portion 137 has a lock receiving part 137A. As a result of a lock claw 139 of the insulating protector 133 being elastically engaged with the lock receiving part 137A, the positive electrode busbar 121 is held by the insulating protector 133.

A bolt through hole 140 is formed passing through the positive electrode terminal connecting portion 138 in the vertical direction. As a result of a bolt 141 being screwed into this bolt through hole 140, the positive electrode busbar 121 and the first high-current busbar 144 are electrically connected to each other.

The negative electrode busbar 135 has: a negative electrode tab connecting portion 142 that is connected to the negative electrode tab 129B of the power storage element 127, and extends in the left-right direction; a held portion 143 that extends downward from the negative electrode tab connecting portion 142, and is held by the insulating protector 133; and a relay portion 145 that is bent at a right angle rearward from the outer end, in the left-right direction, of the held portion 143, and is connected to the relay busbar 120B.

The negative electrode tab 129B and the negative electrode tab connecting portion 142 are connected to each other by a well-known method such as laser welding, ultrasonic welding, soldering, or brazing. In the present embodiment, they are connected to each other by laser welding.

The held portion 143 has a lock receiving part 143A. As a result of a lock claw 146 of the insulating protector 133 being elastically engaged with the lock receiving part 143A, the negative electrode busbar 135 is held by the insulating protector 133.

The relay portion 145 is bent upward in the shape of a crank when viewed in the left-right direction. A bolt through hole 147 is formed at the end, in the front-rear direction, of the relay portion 145 while passing therethrough in the vertical direction. As a result of the bolt 122 being screwed into the bolt through hole 147, the relay busbar 120B and the relay portion 145 are electrically connected to each other.

The upper surface of the insulating protector 133 has a plurality of openings 149 passing therethrough in the vertical direction. The tabs 129 are inserted through the openings 149 from below. In the present embodiment, two lines of openings 149 lined up at a distance in the front-rear direction are formed in the upper surface of the insulating protector 133 in the left-right direction. The positive electrode tabs 129A and the negative electrode tabs 129B of the power storage elements 127 are overlapped and welded to each other in the state of being passed through the openings 149.

Fuse connecting busbars 150 are provided at positions in the openings 149 that are close to the central portion in the left-right direction. The fuse connecting busbars 150 are obtained by pressing metal plate members into a predetermined shape. Any metal such as copper, a copper alloy, aluminum, or an aluminum alloy may be suitably selected as appropriate for the metal of which the fuse connecting busbars 150 are made. The surfaces of the fuse connecting busbars 150 may also be provided with a plated layer made of tin, nickel, or the like.

Each fuse connecting busbar 150 has: a tab connecting portion 151 that is connected to the positive electrode tab 129A or the negative electrode tab 129B that is arranged in the opening 149; an extended portion 152 that extends downward from the tab connecting portion 151 and extends in the left-right direction; and a fuse terminal connecting portion 153 that extends downward from the extended portion 152. The lower end of the fuse terminal connecting portion 153 is fork-shaped and is divided into two portions, which are configured to sandwich and hold a fuse terminal 155A of a low-current fuse 154 that will be described later.

Figure 15:
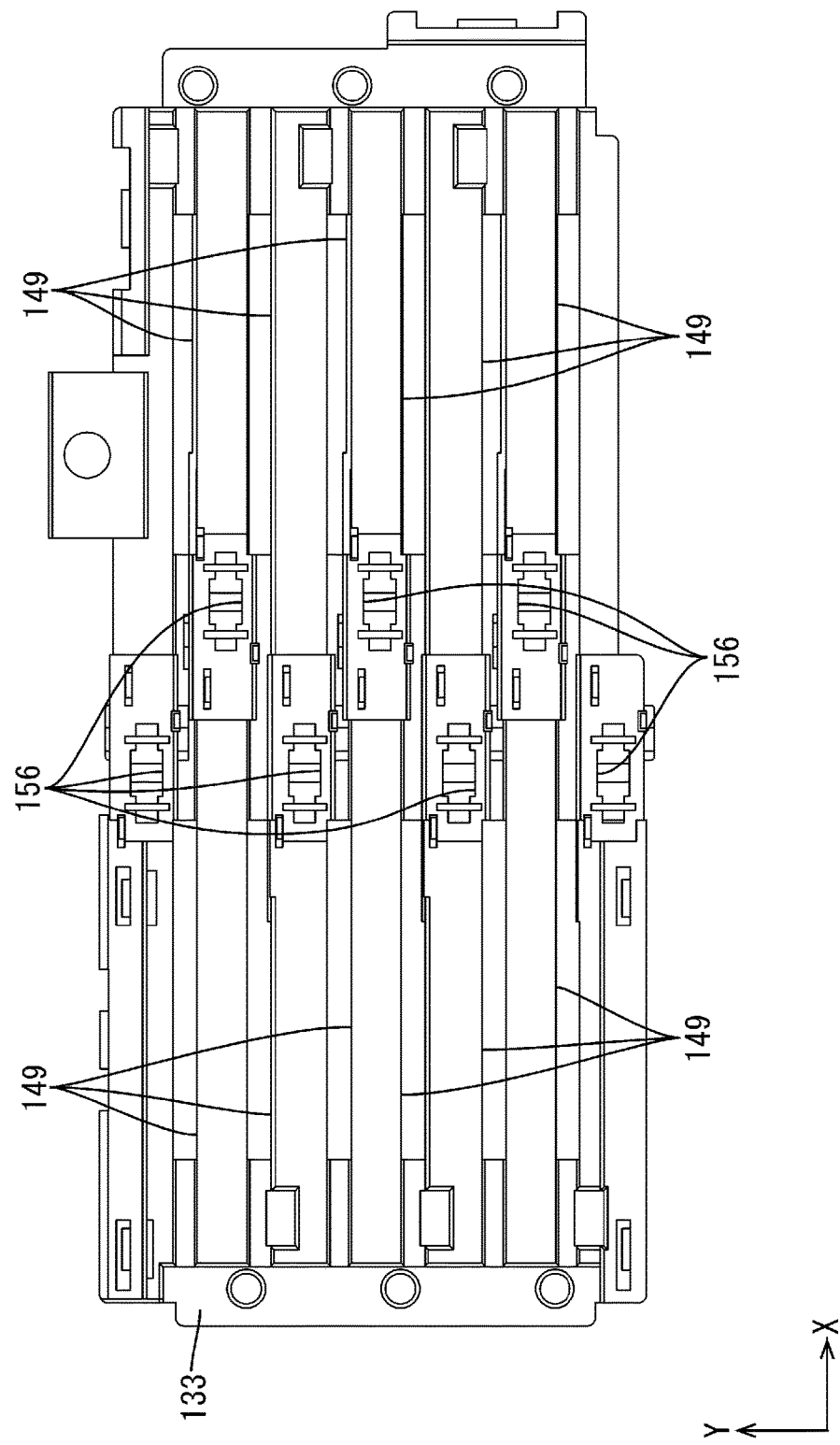
FIG. 15 is a bottom view illustrating the insulating protector.
Figure 16:
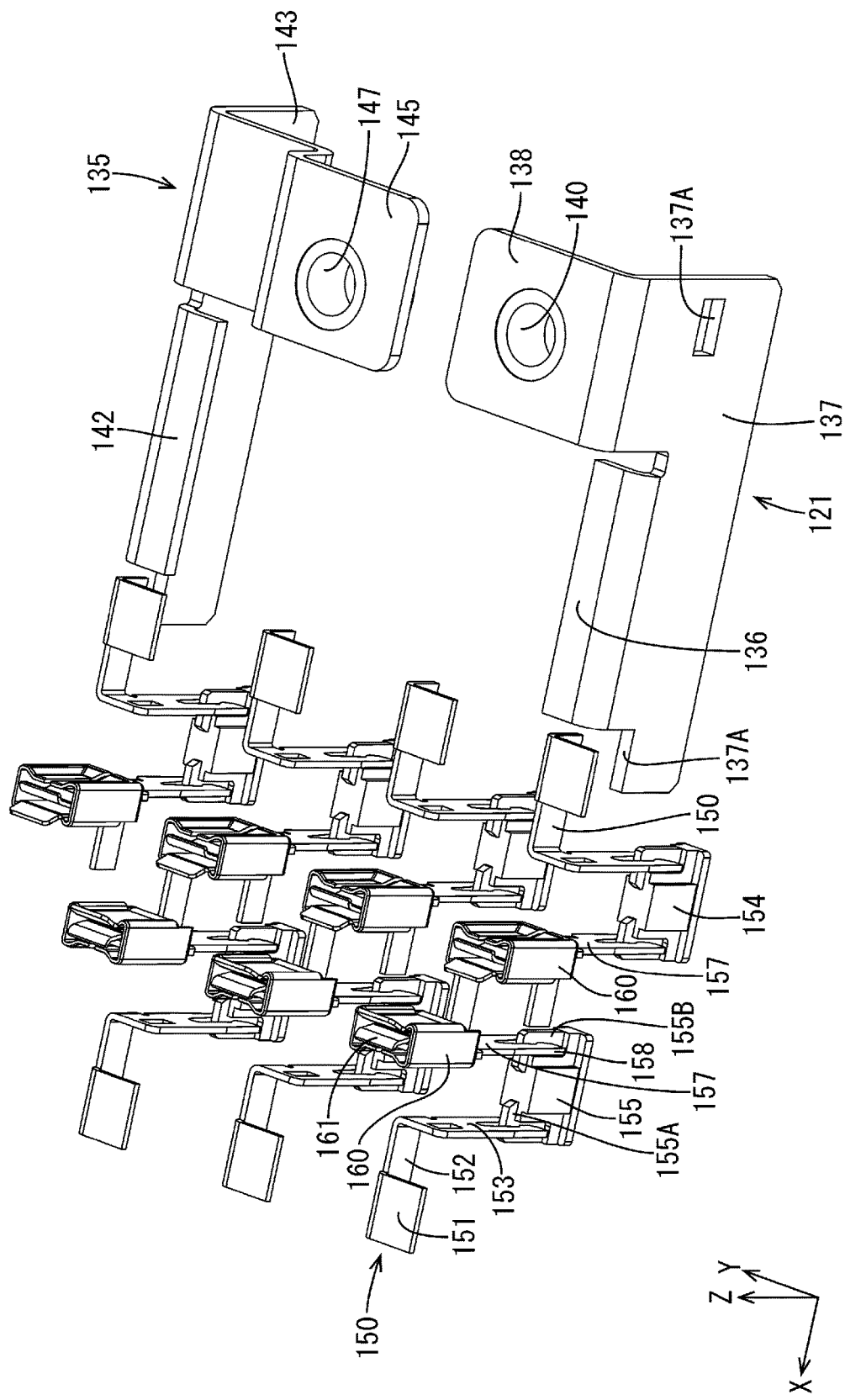
FIG. 16 is a perspective view illustrating the electric connection structure of the power storage unit.

The insulating protector 133 is provided with fuse mounting portions 156 into which the low-current fuses 154 are fitted, the fuse mounting portions 156 being open downward (see FIG. 15). The above-described fuse terminal connecting portions 153 of the fuse connecting busbars 150 protrude into the fuse mounting portions 156 from above (see FIG. 32).

The low-current fuses 154 are mounted in the fuse mounting portions 156 from below. Each low-current fuse 154 has fuse terminals 155A and 155B on both ends in the left-right direction.

Furthermore, fuse terminal connecting portions 158 of voltage detection terminals 157 protrude into the fuse mounting portions 156 from above. The lower end of the fuse terminal connecting portion 158 of each voltage detection terminal 157 as well is fork-shaped and is divided into two portions, which are configured to sandwich and hold the fuse terminal 155B of the low-current fuse 154.

The voltage detection terminals 157 are obtained by pressing metal plate members into a predetermined shape. Any metal such as copper, a copper alloy, aluminum, or an aluminum alloy may be suitably selected as appropriate for the metal of which the voltage detection terminals 157 are made. The surfaces of the voltage detection terminals 157 may also be provided with a plated layer made of tin, nickel, or the like.

The voltage detection terminals 157 are formed extending in the vertical direction. As described above, the lower ends of the voltage detection terminals 157 serve as the fuse terminal connecting portions 158. On the other hand, the upper ends of the voltage detection terminals 157 are tab-shaped.

Figure 14:
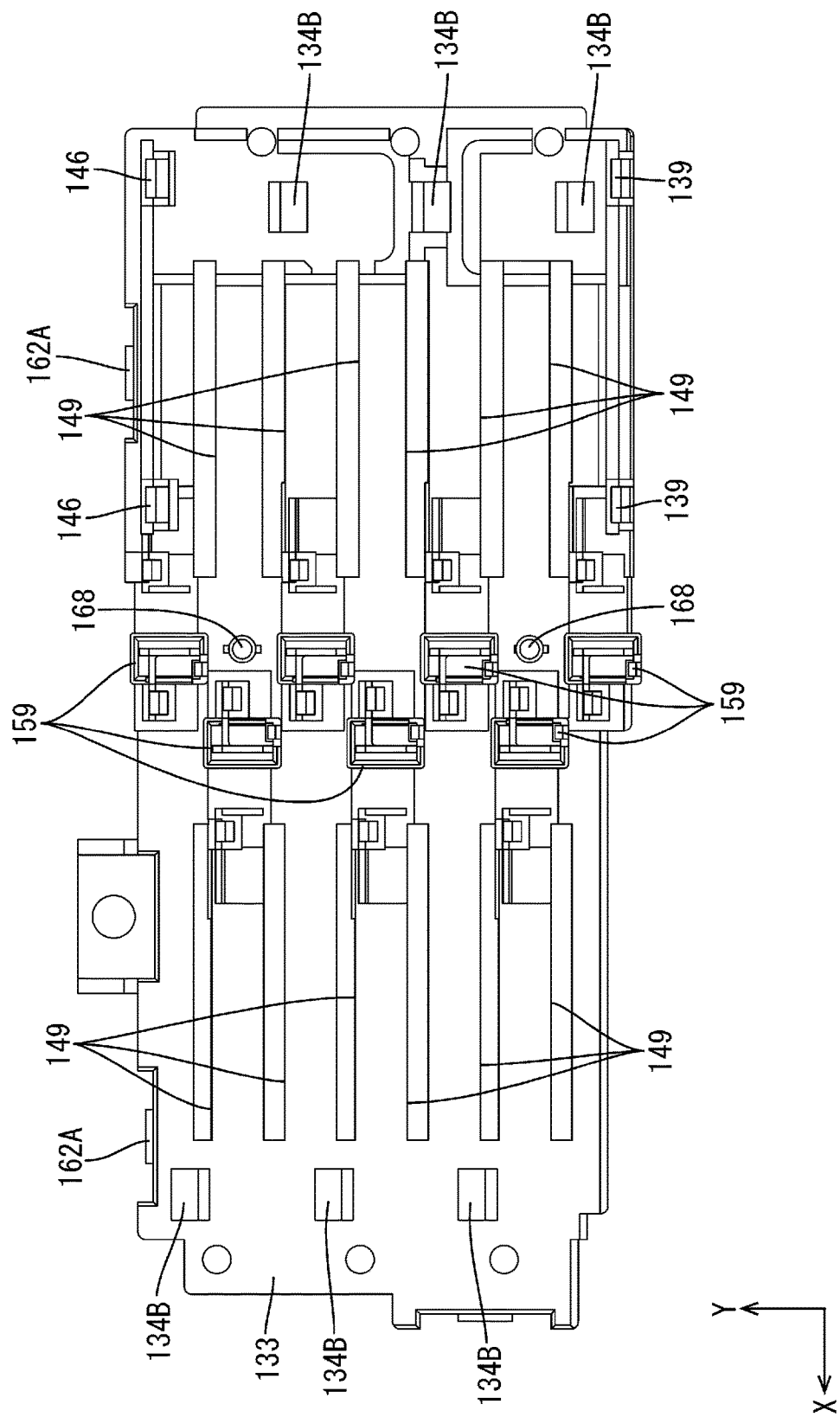
FIG. 14 is a plan view illustrating the insulating protector.

The insulating protector 133 is provided with, in the central portion in the left-right direction of its upper surface, a plurality of (seven in the present embodiment) standby connectors 159 (an example of a standby connection part) that are open upward (see FIG. 14). The standby connectors 159 are lined up in the zigzag shape in the front-rear direction. In other words, a line of three standby connectors 159 lined up in the front-rear direction, and a line of four standby connectors 159 lined up in the front-rear direction are arranged at a distance from each other in the left-right direction, and the standby connectors 159 in the respective lines are arranged at positions that are shifted from each other in the left-right direction.

The upper ends of the above-described voltage detection terminals 157 are arranged protruding upward into the standby connectors 159. Relay terminals 160 are fitted to the upper ends of the voltage detection terminals 157 from above (see FIG. 16).

The relay terminals 160 are obtained by pressing metal plate materials into a predetermined shape and then bending the pressed metal plate materials. Any metal such as copper, a copper alloy, aluminum, or an aluminum alloy may be suitably selected as appropriate for the metal of which the relay terminals 160 are made. The surfaces of the relay terminals 160 may also be provided with a plated layer made of tin, nickel, or the like.

The relay terminals 160 have the shape of substantially a box that is open upward and downward. The relay terminals 160 each have an elastic piece 161 arranged therein. As a result of the elastic piece 161 being brought into elastic contact with the upper end of the corresponding voltage detection terminal 157, the relay terminal 160 and the voltage detection terminal 157 are electrically connected to each other.

Figure 27:
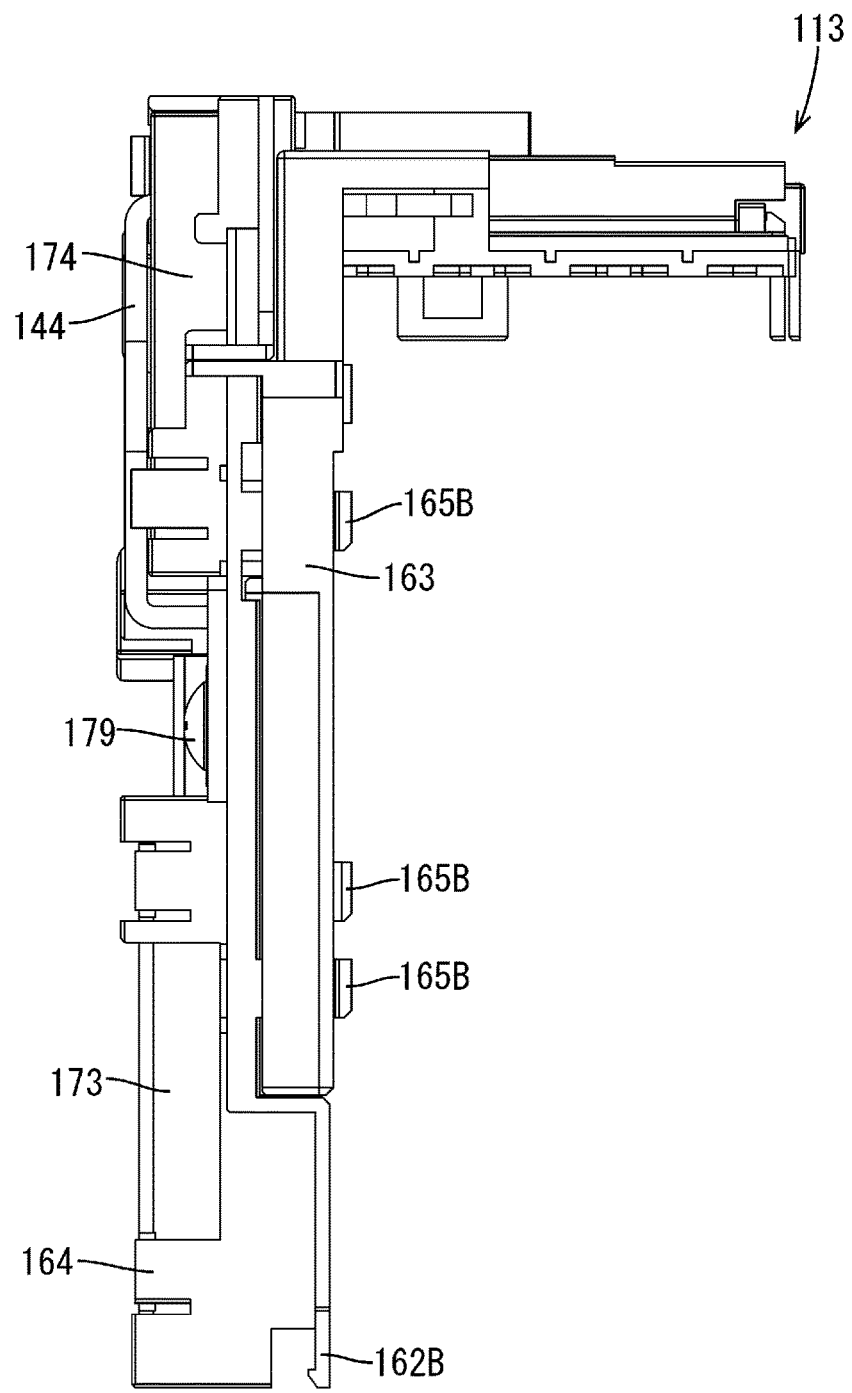
FIG. 27 is a side view illustrating the circuit unit.

The circuit unit 113 as a whole is substantially L-shaped when viewed in the left-right direction (see FIG. 27). The circuit unit 113 is attached to the upper surface of the power storage unit 112 and to a side surface that extends downward from an edge of the upper surface. The circuit unit 113 is provided with: high-current members 183 through which a composite current obtained from the plurality of power storage elements 127 flows; and low-current members 184 through which a detection current for detecting a state of the individual power storage elements 127 flows. The composite current is higher than the detection current.

Figure 30:
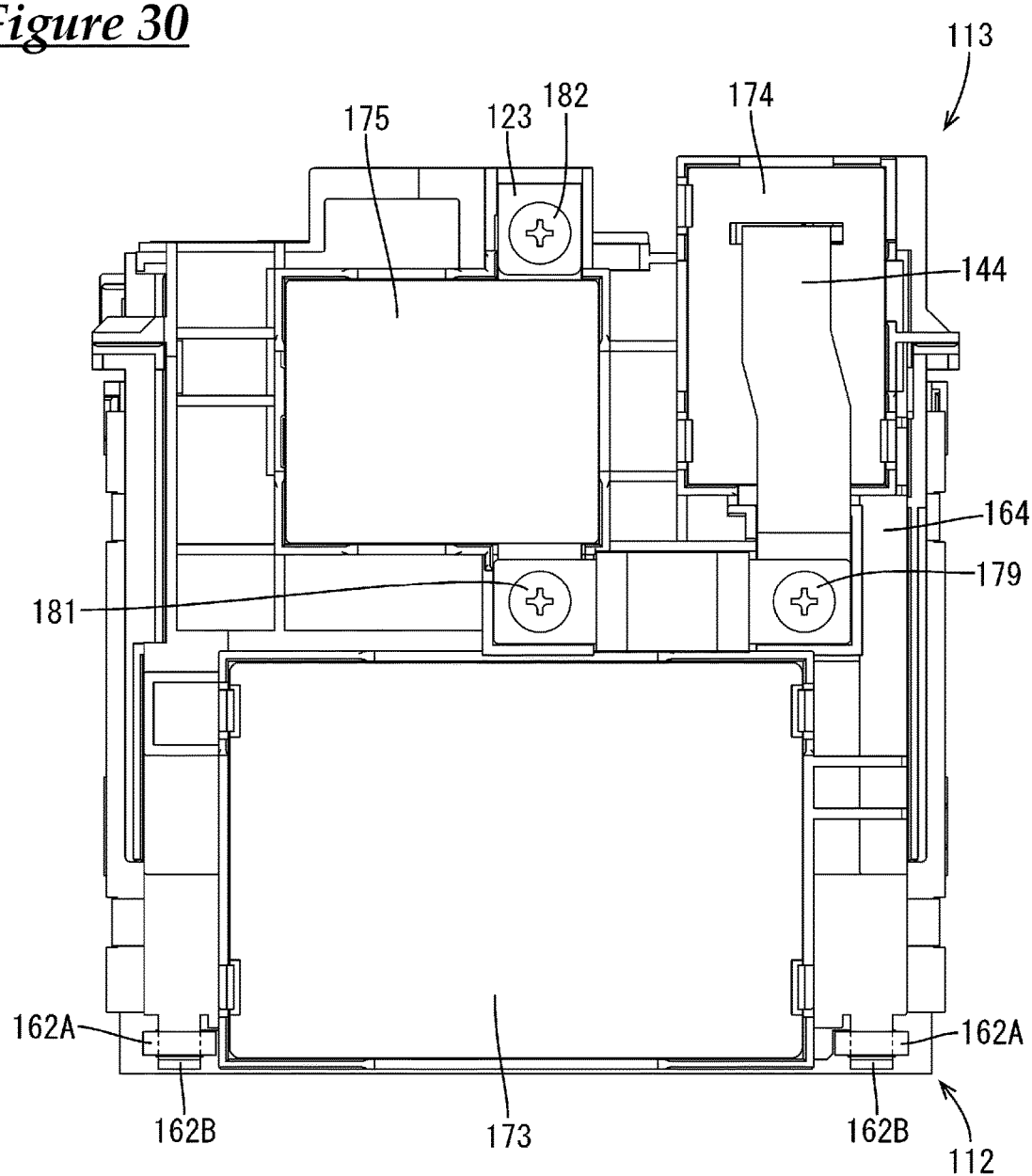
FIG. 30 is a rear view illustrating the state in which the power storage unit and the circuit unit are assembled.
Figure 31:
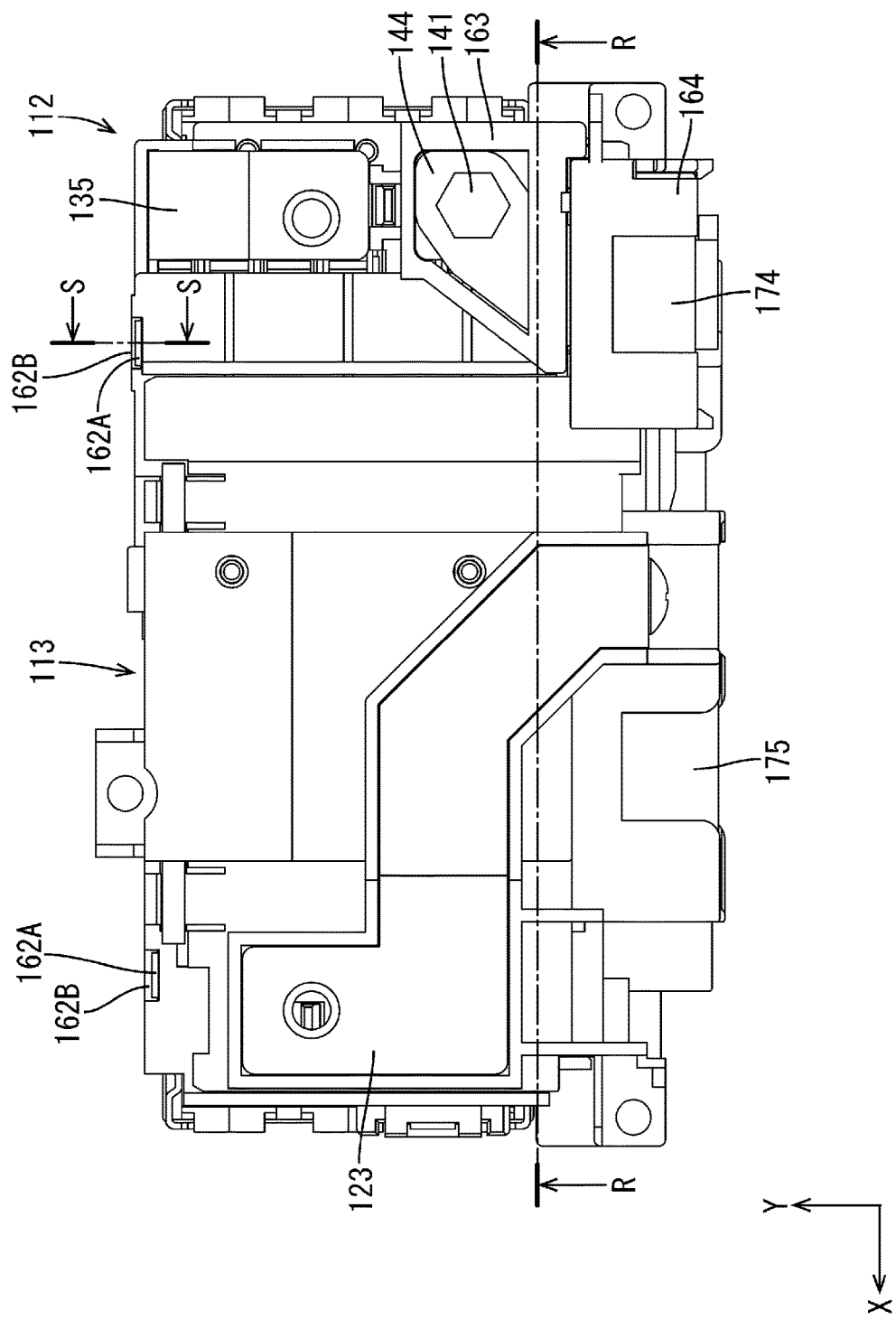
FIG. 31 is a plan view illustrating the state in which the power storage unit and the circuit unit are assembled.
Figure 32:
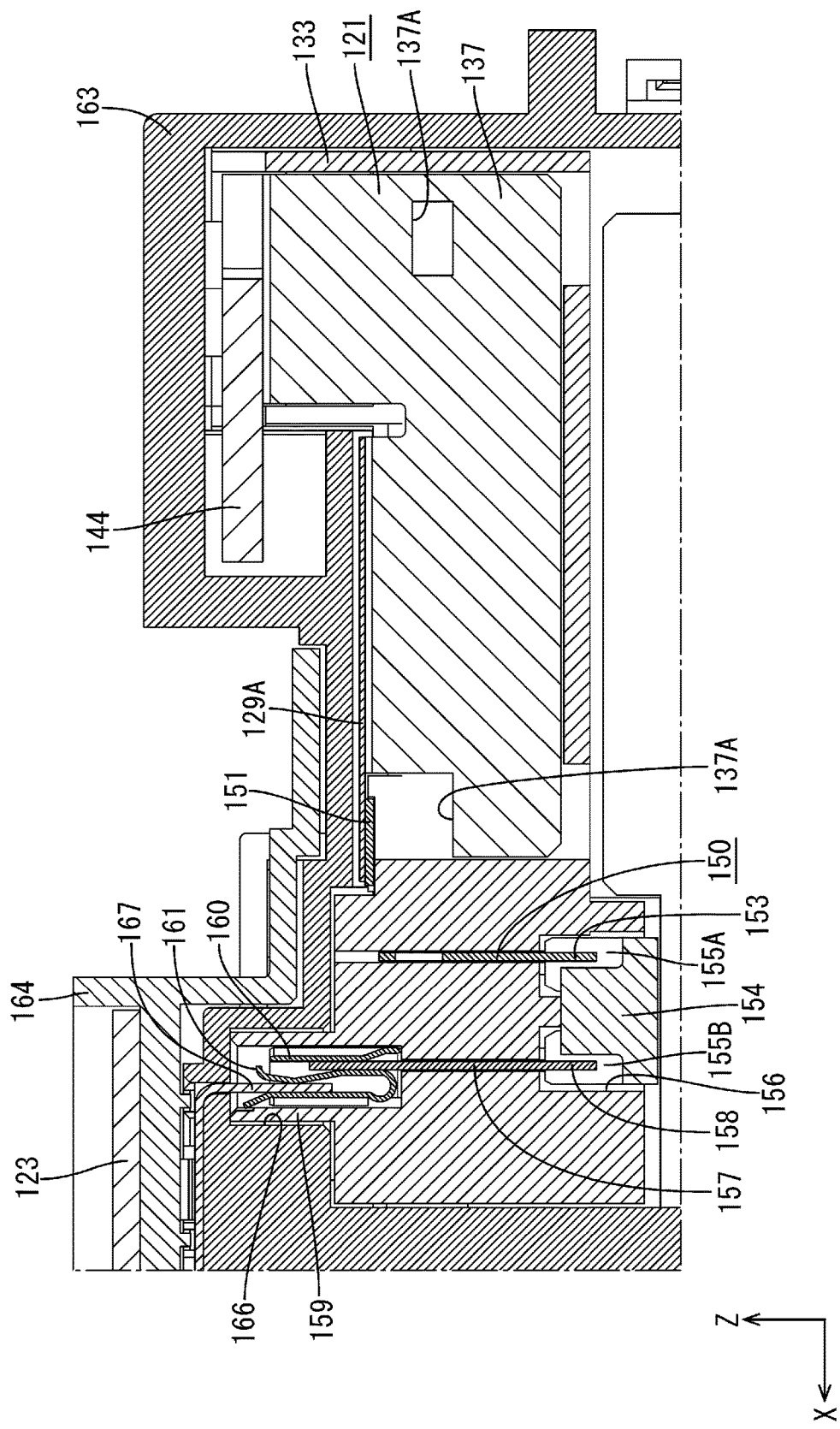
FIG. 32 is a cross-sectional view taken along a line R-R in FIG. 31.
Figure 33:
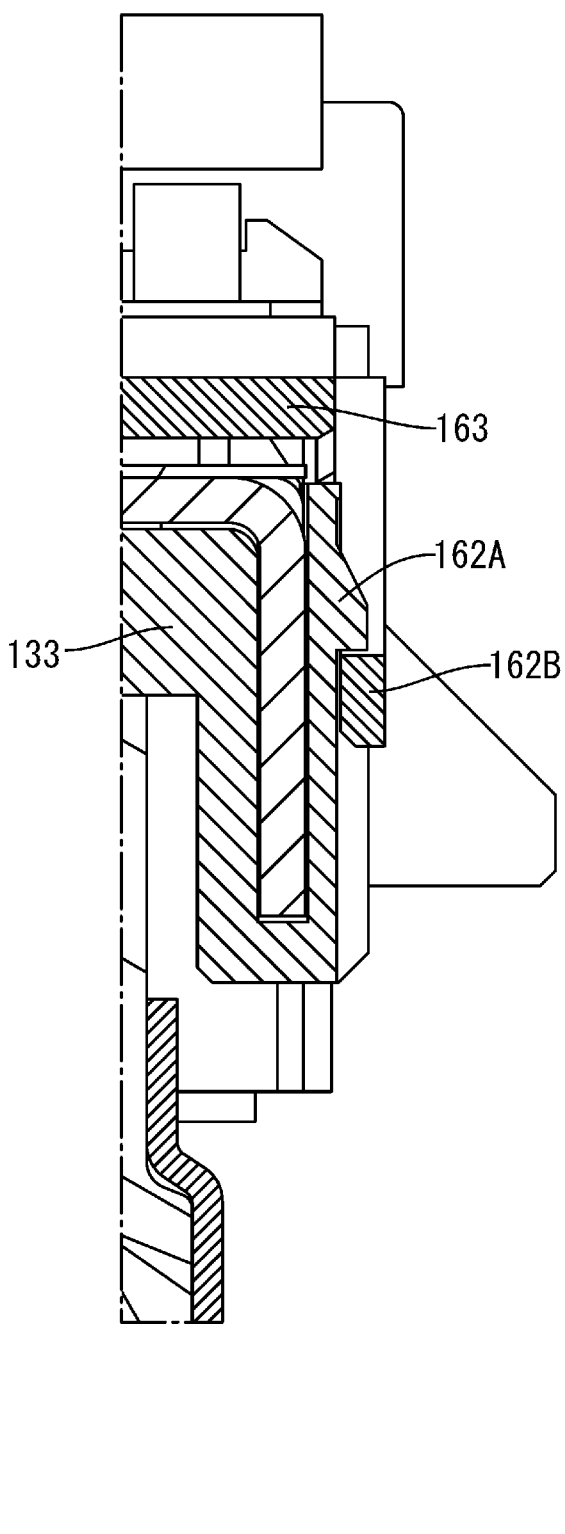
FIG. 33 is a cross-sectional view taken along a line S-S in FIG. 31.

The power storage unit 112 and the circuit unit 113 are assembled, as a result of lock parts 162A formed on the power storage unit 112 being elastically engaged with lock receiving parts 162B formed on the circuit unit 113 at the positions that correspond to the lock parts 162A (see FIGS. 30 and 33).

Figure 17:
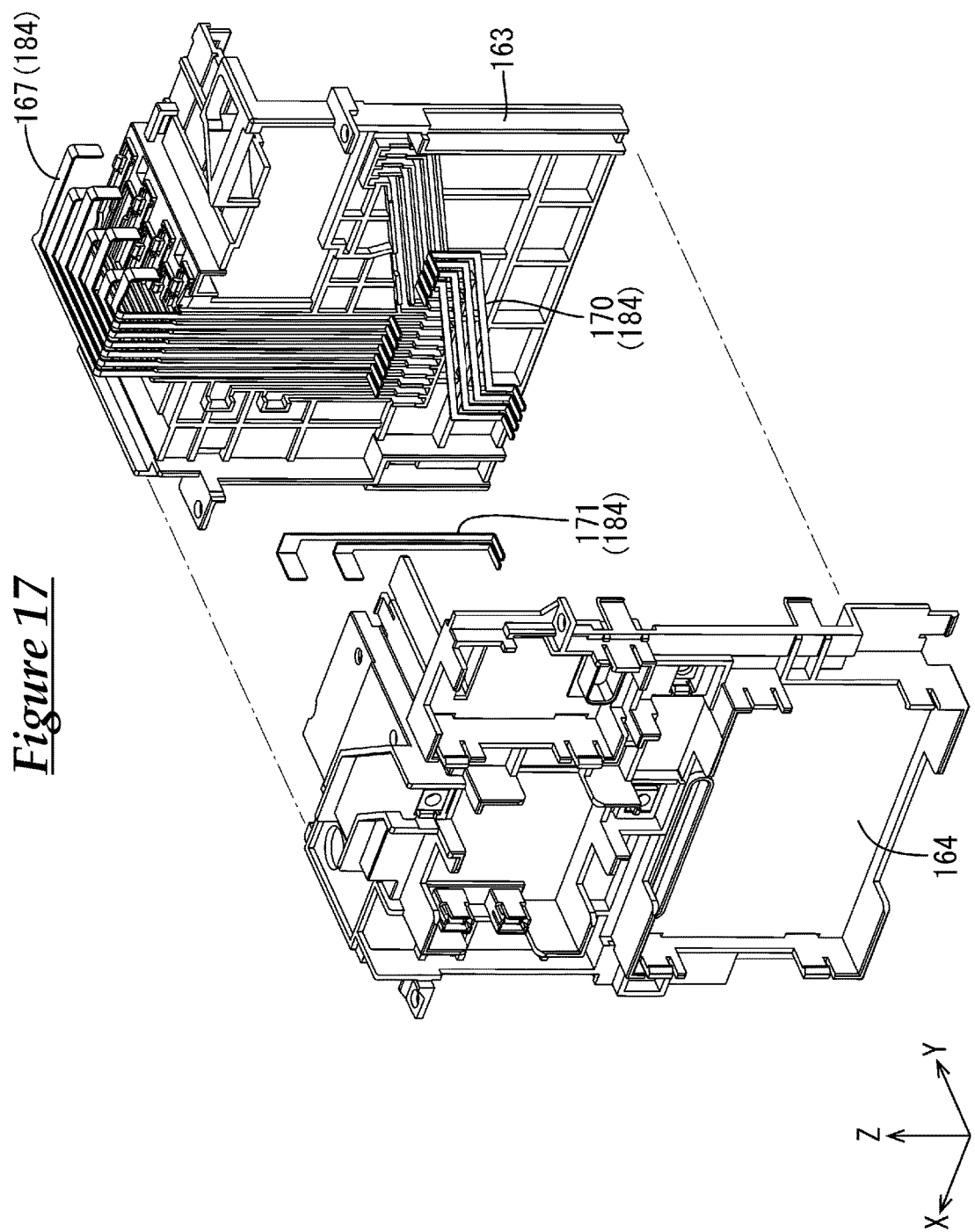
FIG. 17 is an exploded perspective view illustrating the circuit unit.

The circuit unit 113 includes: a lower case 163 (an example of a circuit holding member and an example of a first case); and an upper case 164 (an example of the circuit holding member and an example of a second case) that is attached on the lower case 163 (see FIG. 17). The lower case 163 and the upper case 164 are made of an insulating synthetic resin.

Figure 26:
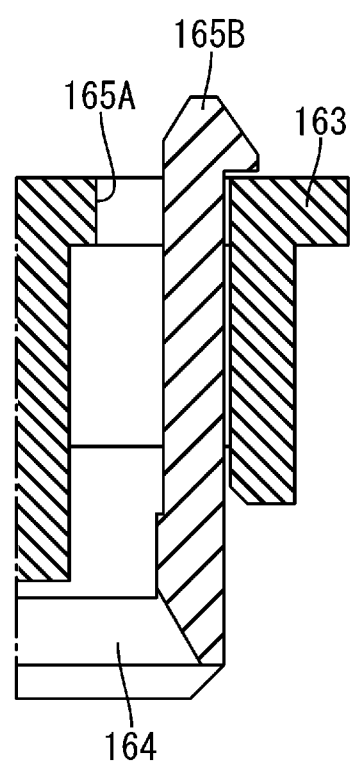
FIG. 26 is a cross-sectional view taken along a line Q-Q in FIG. 25.
Figure 28:
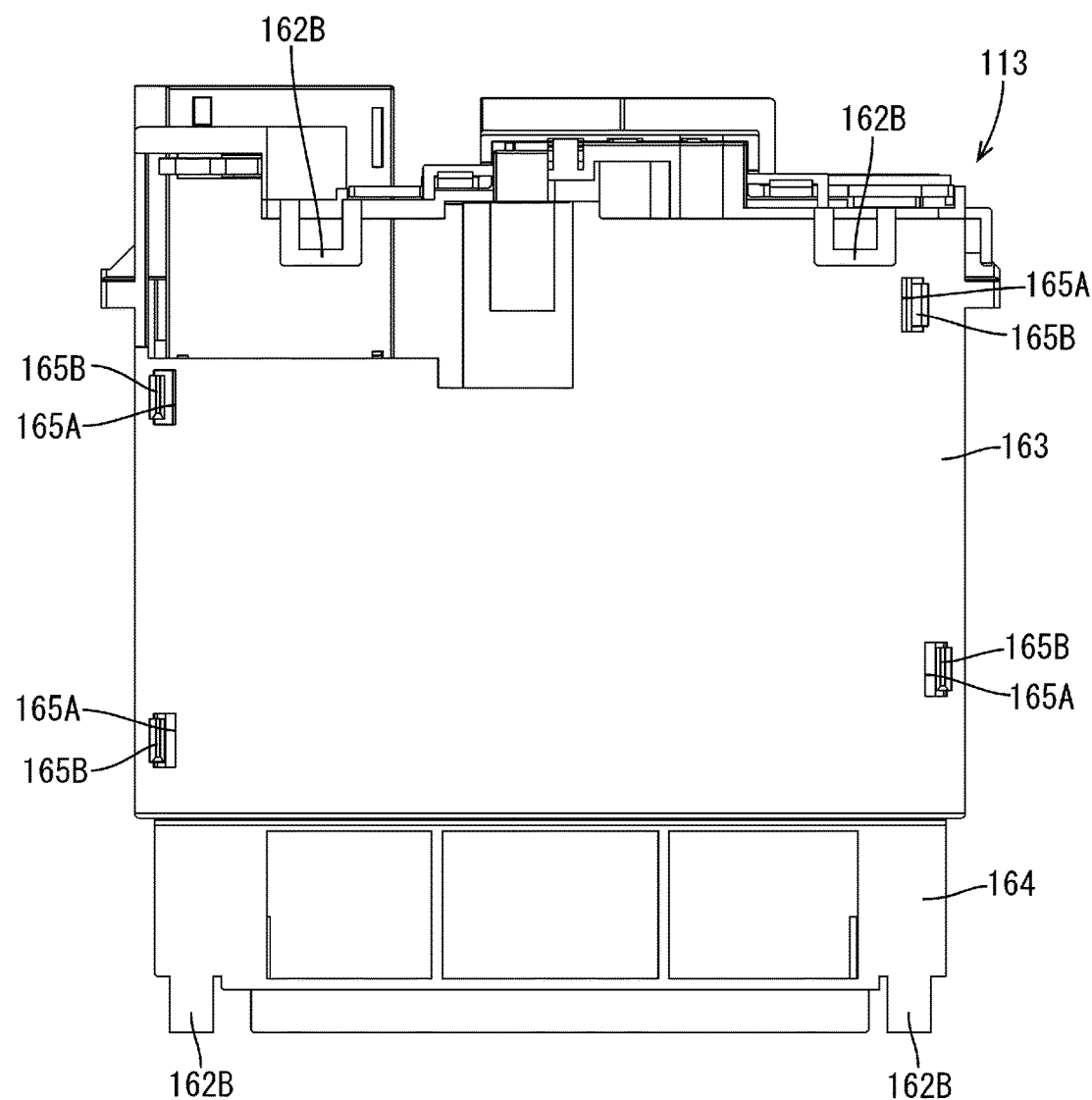
FIG. 28 is a front view illustrating the circuit unit.
Figure 29:
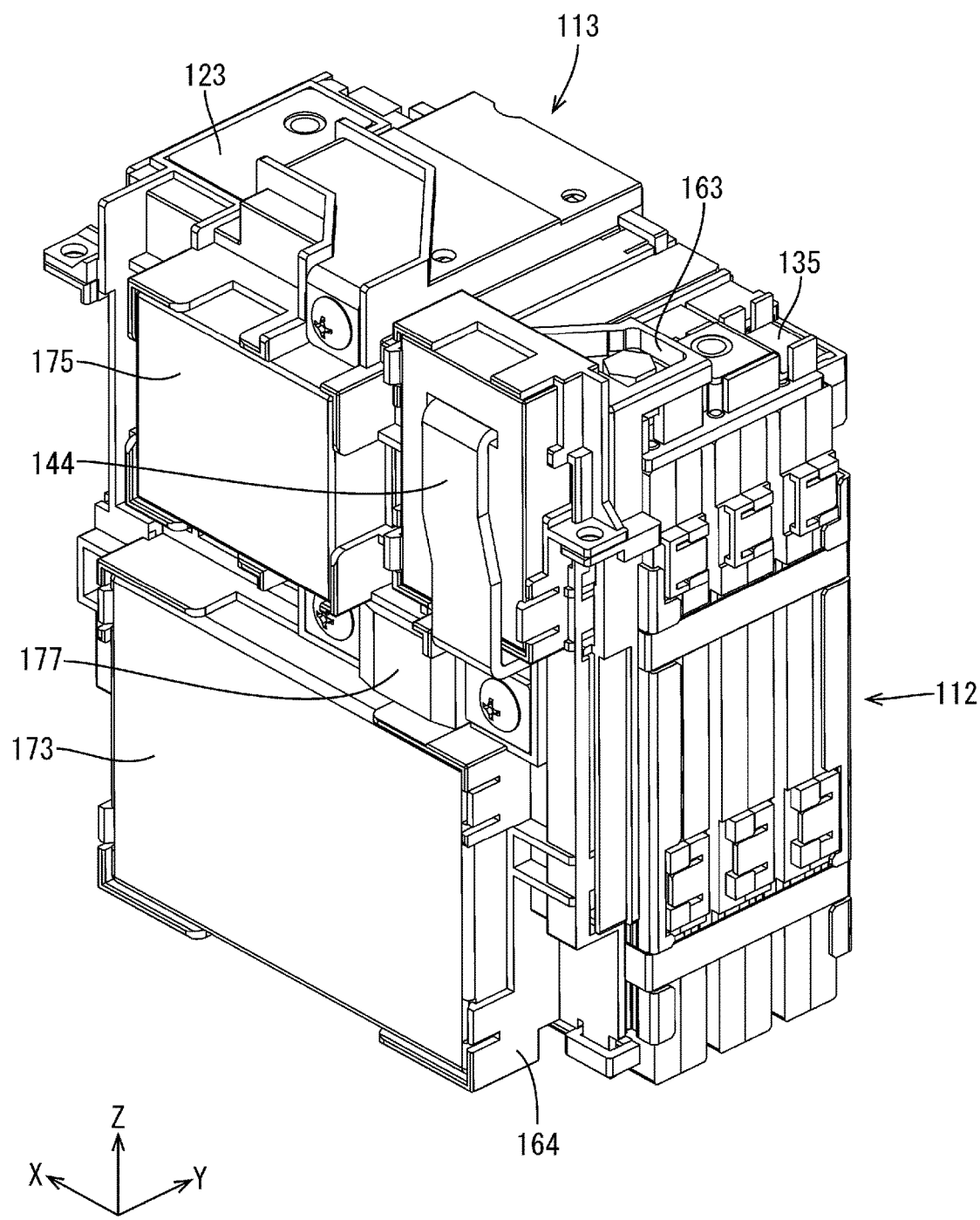
FIG. 29 is a perspective view illustrating a state in which the power storage unit and the circuit unit are assembled.

The lower case 163 and the upper case 164 are assembled, as a result of lock parts 165A formed in the lower case 163 being elastically engaged with lock receiving parts 165B formed on the upper case 164 at the positions that correspond to the lock parts 165A (see FIGS. 26 and 28).

Figure 18:
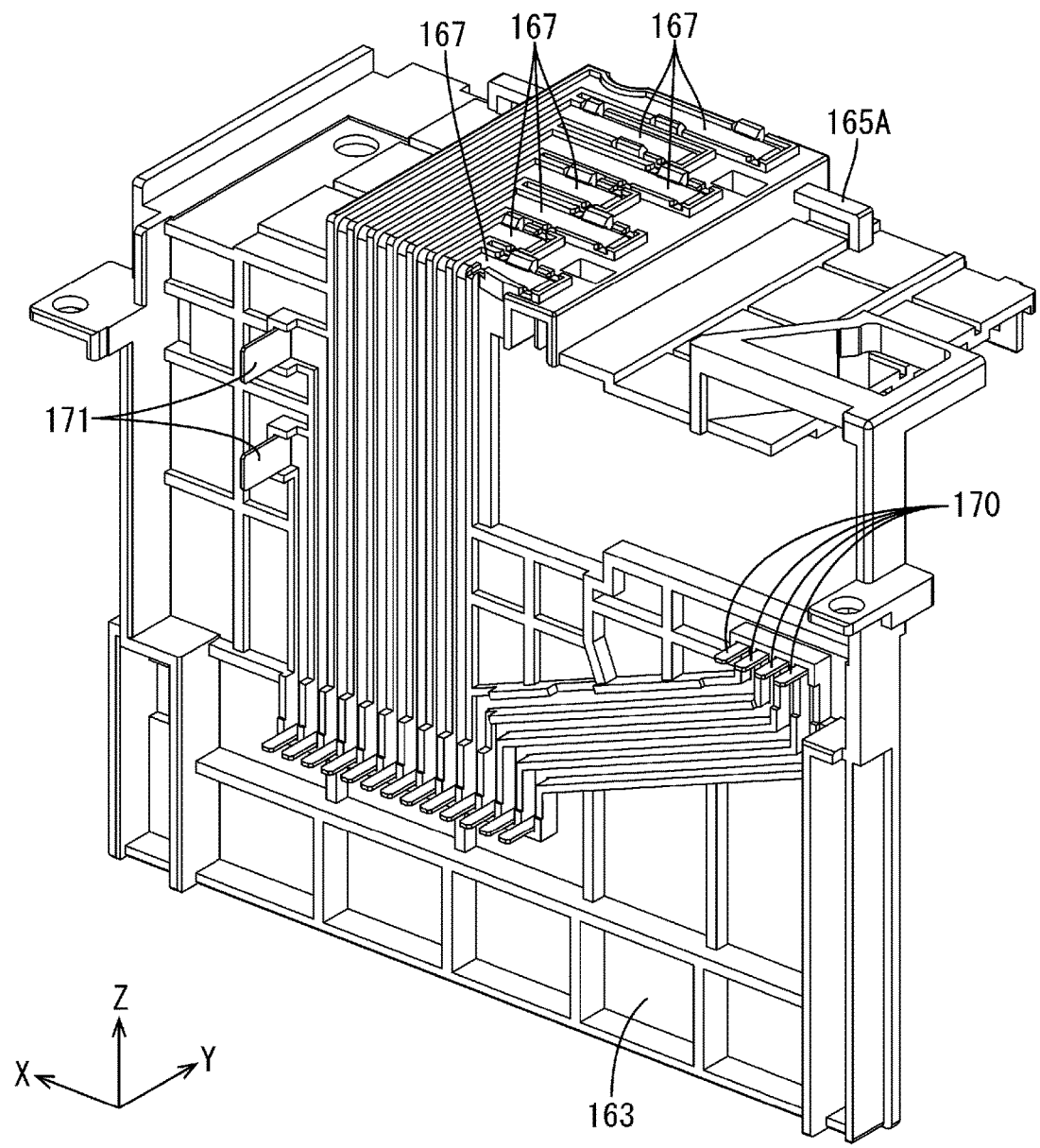
FIG. 18 is a perspective view illustrating a lower case and low-current members.

The lower case 163 is provided with: a side wall that extends in the vertical direction; and an upper wall that is bent substantially perpendicular from the upper end of the side wall in the front-rear direction (see FIG. 18).

Figure 19:
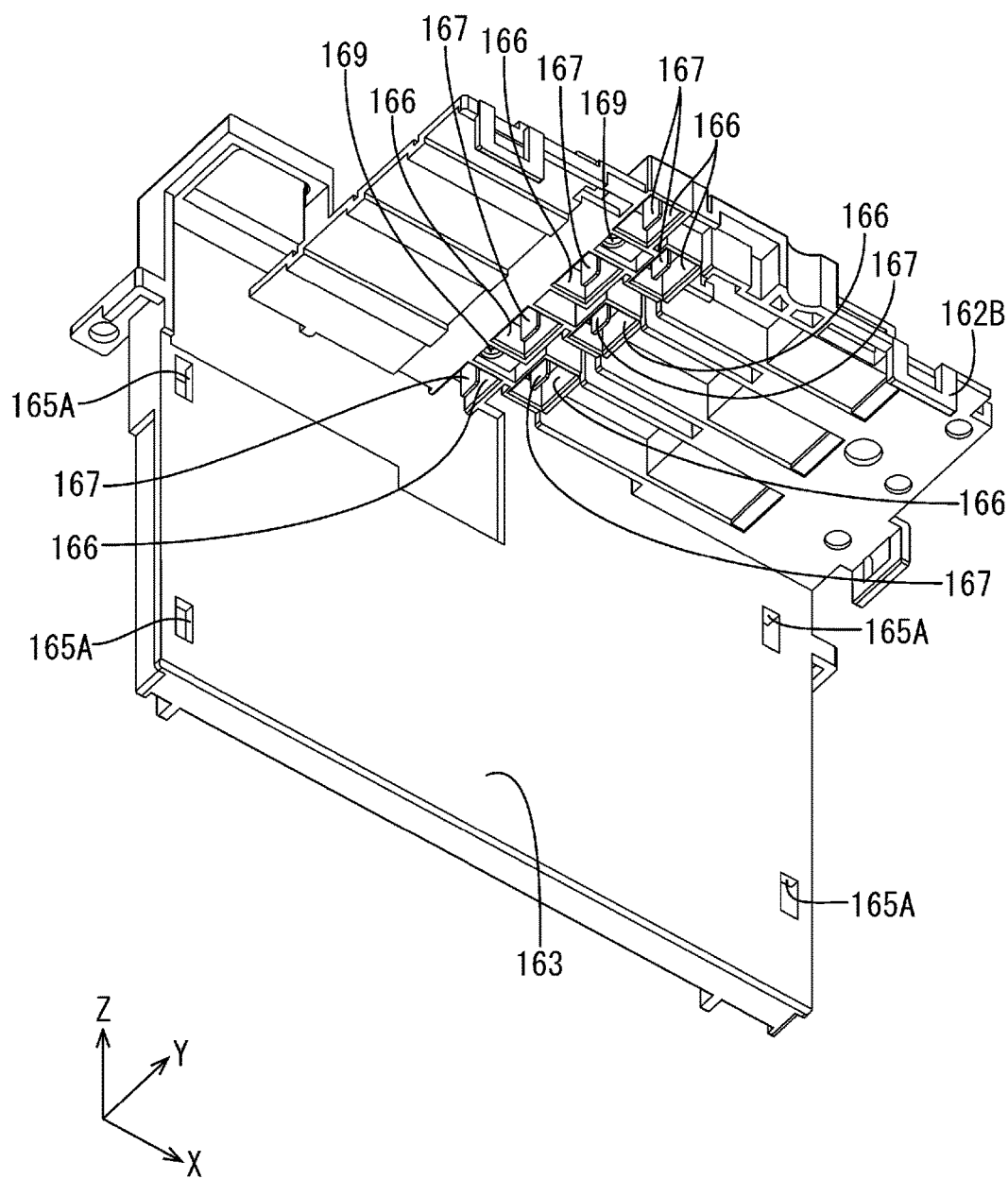
FIG. 19 is a perspective view illustrating the lower case viewed in a direction different from the direction of FIG. 18.

The lower surface of the upper wall of the lower case 163 is provided with circuit unit-side connectors 165 (an example of counterpart connectors) at positions in the vicinity of the central portion in the left-right direction and correspond to the standby connectors 159 of the insulating protector 133 (see FIG. 19). The circuit unit-side connectors 165 have the shape of a square tube that opens downward. Ends of first low-current busbars 167 (an example of the low-current member 184), which will be described later, protrude into the circuit unit-side connectors 165 from above. The ends of the first low-current busbars 167 are fitted to the relay terminals 160 of the standby connectors 159 from above (see FIG. 32).

The insulating protector 133 of the power storage unit 112 is provided with, in the vicinity of the standby connectors 159 on its upper surface, guide parts 168 protruding upward. In the present embodiment, two guide parts 168 are formed. One of the two guide parts 168 is formed at the position on the left side of the second standby connector 159 from the rear end. Also, the other one of the guide parts 168 is formed on the left side of the second standby connector 159 from the front end.

The lower surface of the upper wall of the lower case 163 is provided with, at the positions that correspond to the guide parts 168, guide destination (guided-to) parts 169 that are recessed upward and into which the guide parts 168 are inserted. As a result of the guide parts 168 being inserted into the guide destination parts 169, relative positioning of the power storage unit 112 and the circuit unit 113 can be realized.

The plurality of (seven in the present embodiment) first low-current busbars 167 (an example of the low-current member 184); a plurality of (four in the present embodiment) second low-current busbars 170 (an example of the low-current member 184); and a plurality of (two in the present embodiment) third low-current busbars 171 (an example of the low-current member 184) are provided on the upper surface of the upper wall of the lower case 163 and the surface of the side wall of the lower case 163 that faces away from the power storage unit 112 (see FIG. 18).

In a state in which the lower case 163 and the upper case 164 are assembled, the first low-current busbars 167, the second low-current busbars 170, and the third low-current busbars 171 are arranged between the lower case 163 and the upper case 164.

The first low-current busbars 167, the second low-current busbars 170, and the third low-current busbars 171 are obtained by pressing metal plate members into predetermined shapes. Any metal such as copper, a copper alloy, aluminum, or an aluminum alloy may be suitably selected as appropriate for the metal of which the first low-current busbars 167, the second low-current busbars 170, and the third low-current busbars 171 are made. The surfaces of the first low-current busbars 167, the second low-current busbars 170, and the third low-current busbars 171 may also be provided with a plated layer made of tin, nickel, or the like.

The first low-current busbars 167 are arranged spanning the upper surface of the upper wall of the lower case 163 and the rear surface of the side wall of the lower case 163 (see FIG. 18). The ends of the portions of the first low-current busbars 167 that are provided on the upper surface of the upper wall of the lower case 163 are located inside of the above-described circuit unit-side connectors 165 while being bent downward, and are connected to the relay terminals 160. The lower ends of the first low-current busbars 167 are bent rearward, and are connected to a state detecting part 173 that will be descried later. The state detecting part 173 is configured to detect a state of the individual power storage elements 127 based on a detection current input to the state detecting part 173 via the first low-current busbars 167.

The second low-current busbars 170 are arranged on the rear surface of the side wall of the lower case 163 (see FIG. 18). The lower ends of the second low-current busbars 170 are bent rearward, and are connected to the state detecting part 173. The upper ends of the second low-current busbars 170 are bent rearward, and are connected to a current sensor 174, which will be described later. The state detecting part 173 is configured to calculate, based on current signals that are transferred from the current sensor 174 to the state detecting part 173 via the second low-current busbars 170, a value of a current flowing through the first high-current busbar 144 (an example of the high-current member 183), which will be described later.

The third low-current busbars 171 are arranged on the rear surface of the lower case 163 (see FIG. 18). The lower ends of the third low-current busbars 171 are bent rearward, and are connected to the state detecting part 173. The upper ends of the third low-current busbars 171 are bent rearward, and are connected to a relay 175 (an example of the high-current member 183), which will be described later. The relay 175 is configured to switch supply (ON) and shutoff (OFF) of a composite current flowing from the power storage unit via the high-current busbar, in response to a switching signal transferred from the state detecting part 173 to the relay 175 via the third low-current busbars 171.

Figure 20:
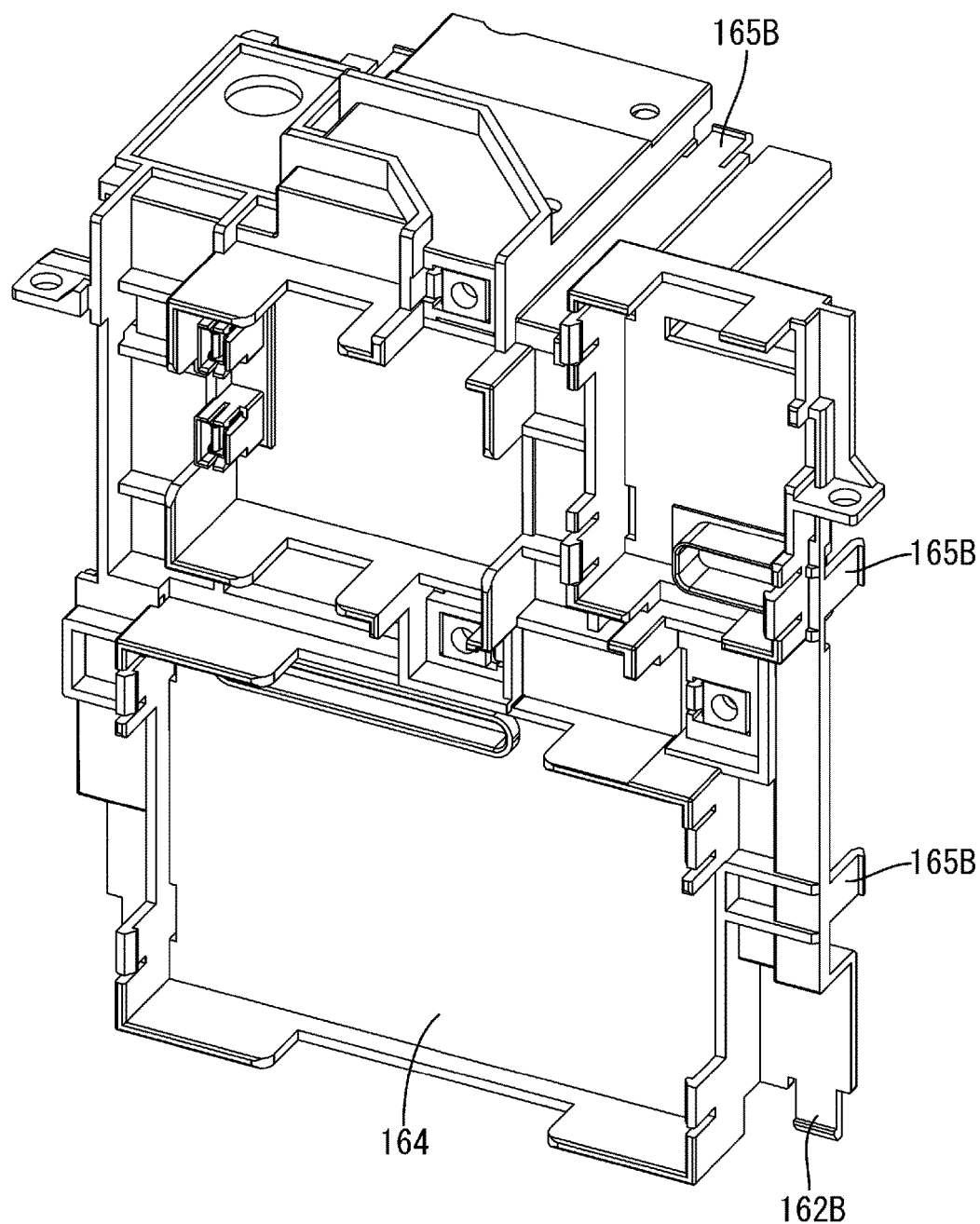
FIG. 20 is a perspective view illustrating an upper case.
Figure 21:
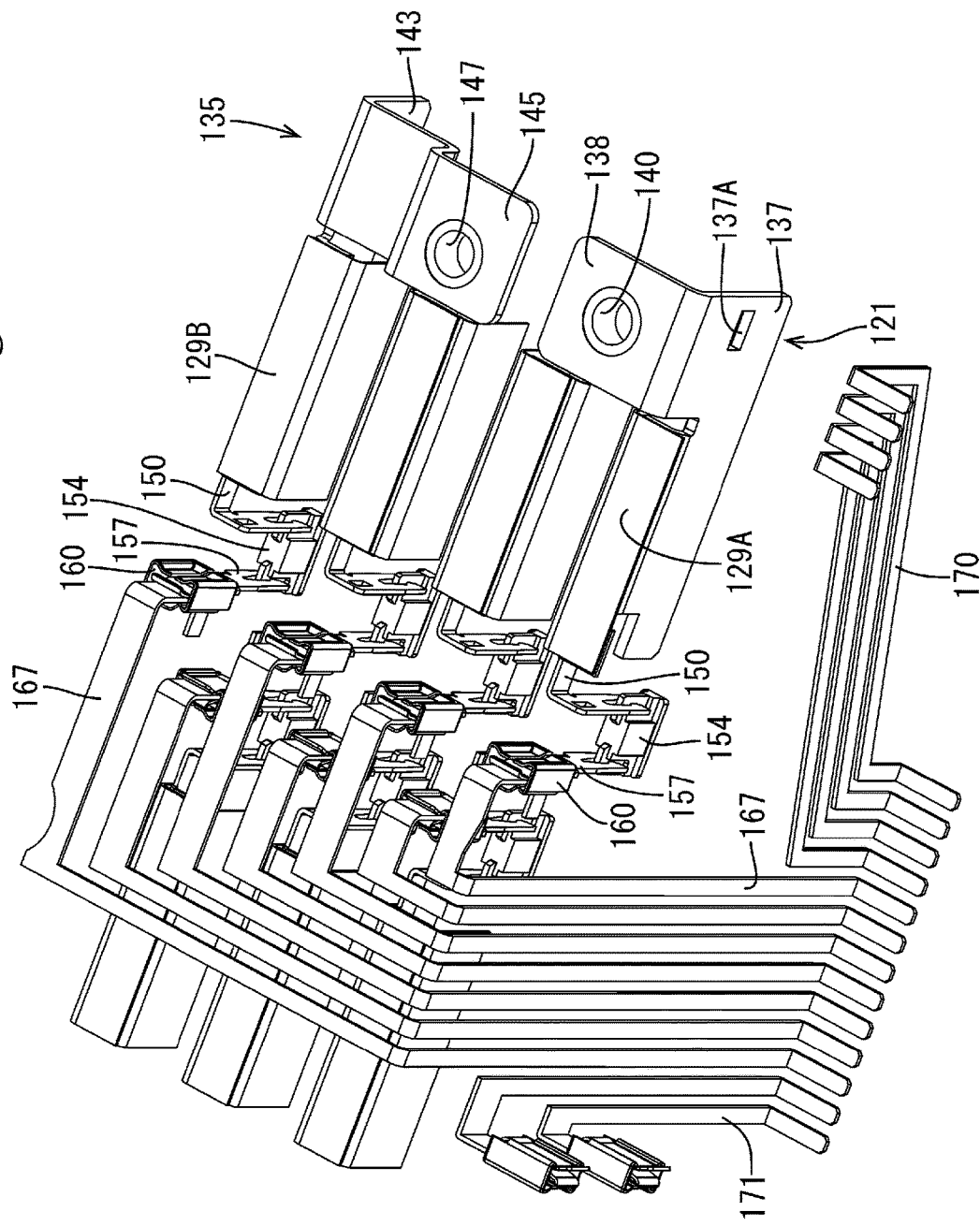
FIG. 21 is a perspective view illustrating the electric connection structure between the power storage unit and the circuit unit.
Figure 22:
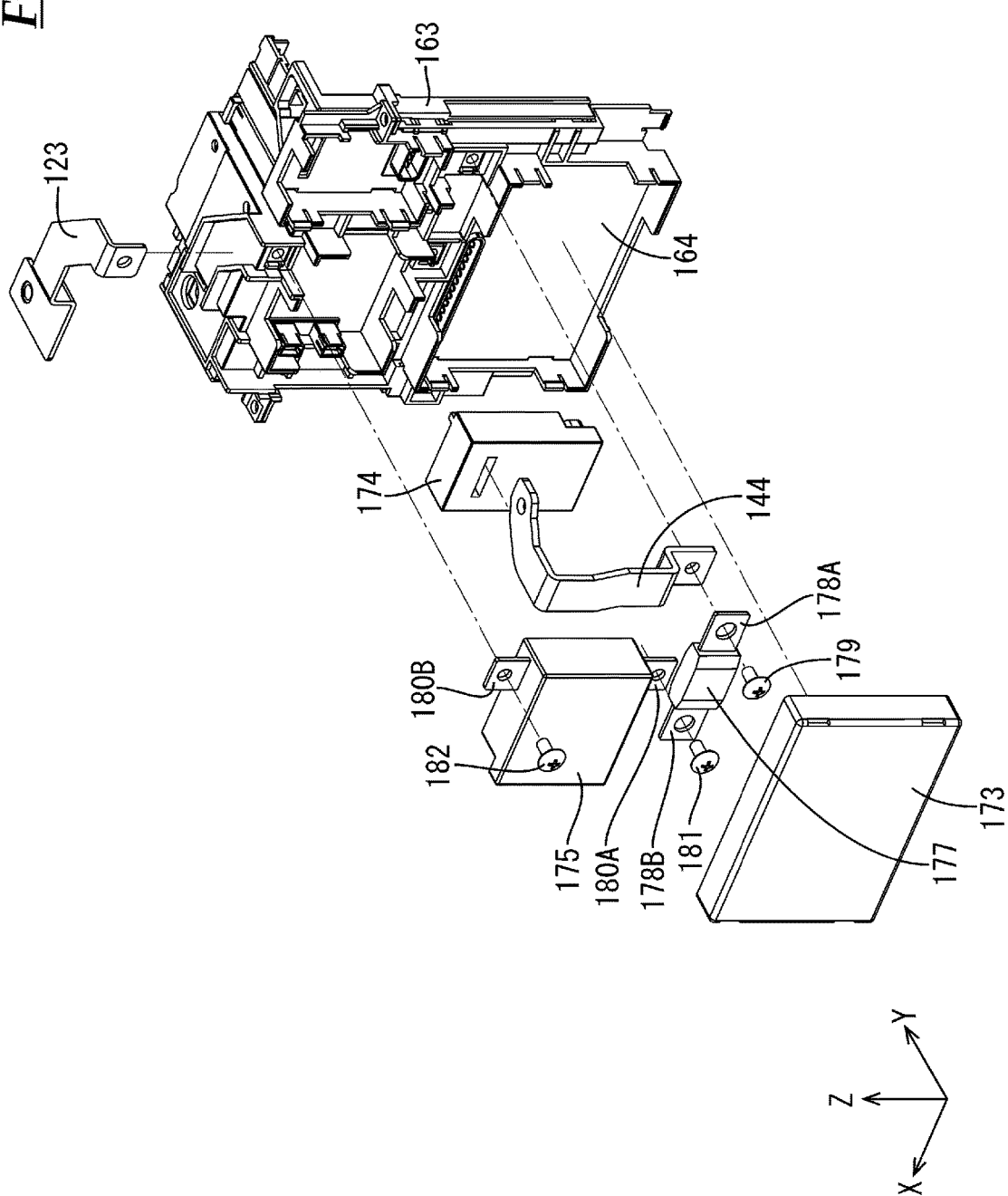
FIG. 22 is an exploded perspective view illustrating the upper case and high-current members.
Figure 23:
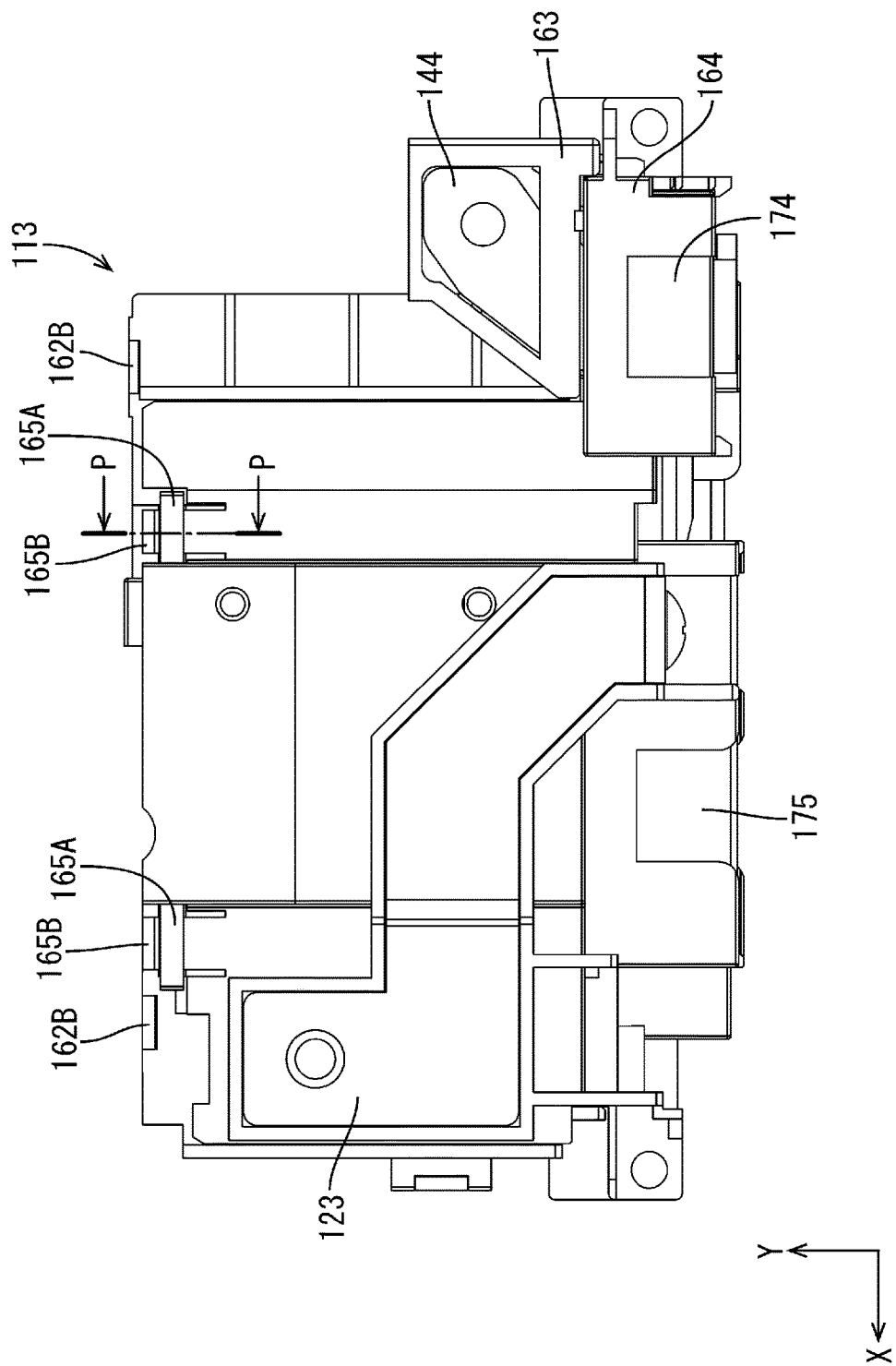
FIG. 23 is a plan view illustrating the circuit unit.
Figure 24:
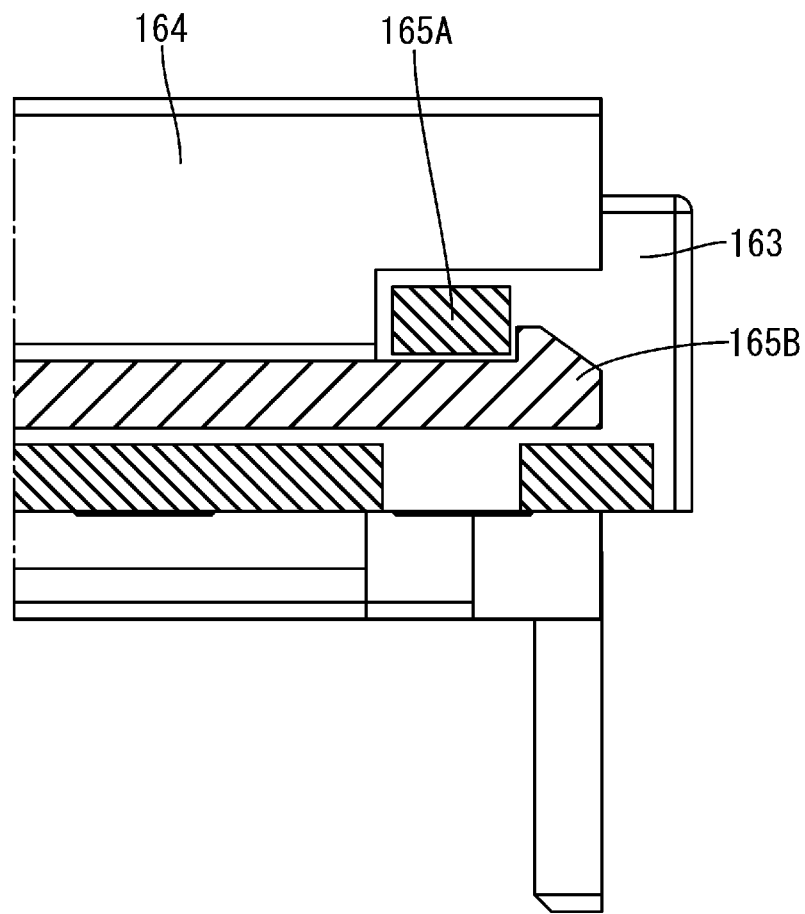
FIG. 24 is a cross-sectional view taken along a line P-P in FIG. 23.
Figure 25:
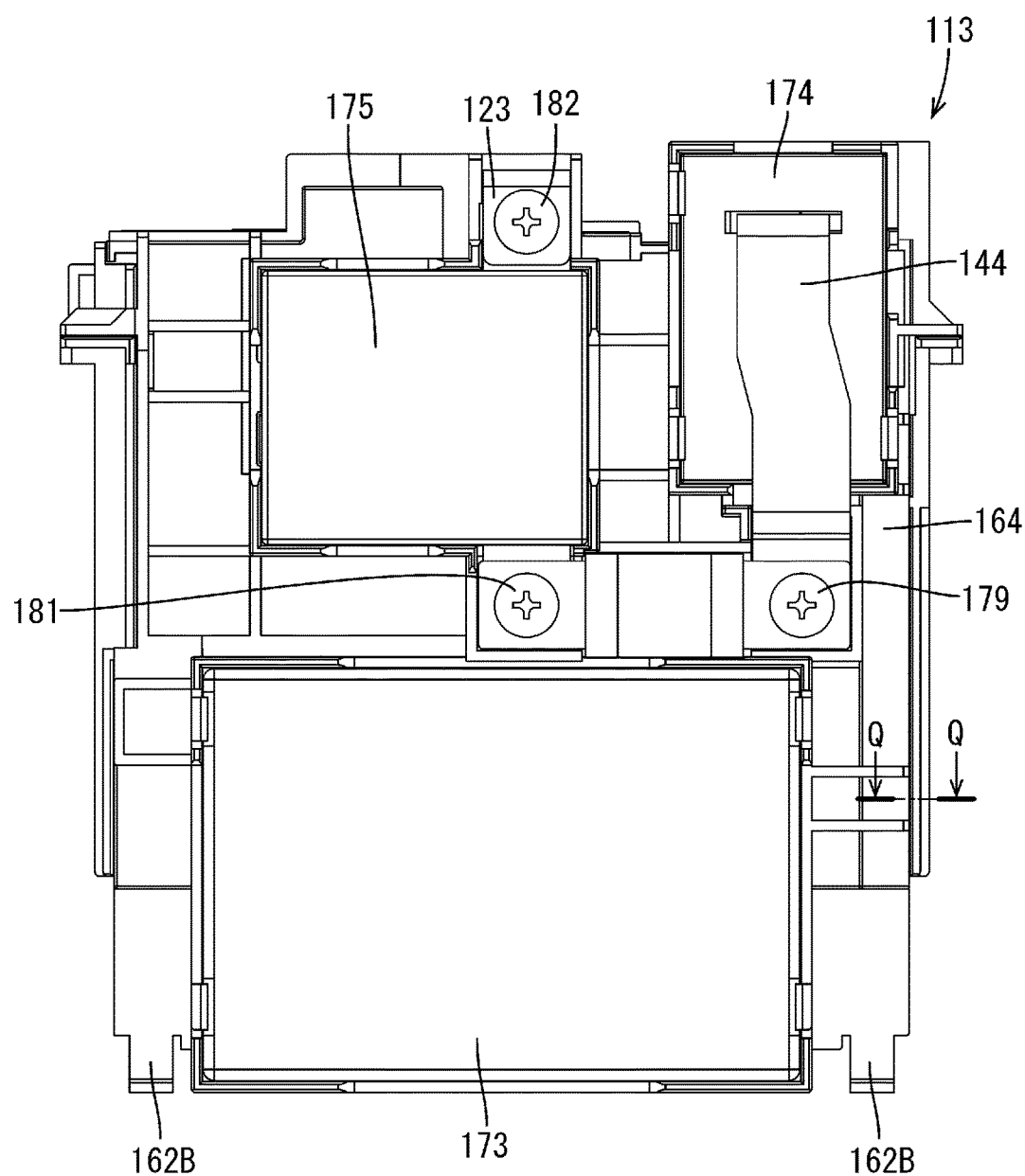
FIG. 25 is a rear view illustrating the circuit unit.

The upper case 164 is provided with: a side wall that extend in the vertical direction; and an upper wall that is bent at substantially a right angle from the upper end of the side wall in the front-rear direction (see FIG. 20). The first high-current busbar 144 is provided spanning the upper surface of the upper wall of the upper case 164 and the rear surface of the side wall of the upper case 164 (see FIG. 8). The first high-current busbar 144 is obtained by pressing a metal plate member into a predetermined shape. Any metal such as copper, a copper alloy, aluminum, or an aluminum alloy may be suitably selected as appropriate for the metal of which the first high-current busbar 144 is made. The surface of the first high-current busbar 144 may also be provided with a plated layer made of tin, nickel, or the like.

The end of the first high-current busbar 144 that is arranged on the upper surface of the upper wall of the upper case 164 is fixed to the positive electrode terminal connecting portion 138 of the positive electrode busbar 121 with the bolt 141. The portion of the first high-current busbar 144 that is arranged on the rear surface of the side wall of the upper case 164 penetrates the current sensor 174 (see FIG. 22). The current sensor 174 detects a composite current flowing through the first high-current busbar 144 using a well-known method. The current sensor 174 transmits a current signal to the state detecting part 173 via the second low-current busbars 170. Note that the current sensor 174 may be configured to transmit a current signal to an ECU via a connector and an external circuit-side connector.

Furthermore, the lower end of the first high-current busbar 144 is connected to a lead terminal 178A of a high-current fuse 177 (an example of the high-current member 183) with a bolt 179.

The high-current fuse 177 has a pair of lead terminals 178A and 178B. One lead terminal 178A is connected to the above-described lower end of the first high-current busbar 144. The other lead terminal 178B is connected to one lead terminal 180A of the relay 175 with a bolt 181.

The relay 175 is turned on/off in response to a signal transmitted from the state detecting part 173 via the third low-current busbars 171. The state detecting part 173 receives a current signal from the current sensor 174 via the second low-current busbars 170, and turns the relay 175 off when the current value calculated based on this current signal is larger than a predetermined threshold.

Another lead terminal 180B of the relay 175 is connected to the second high-current busbar 123 (an example of the high-current member 183) with a bolt 182.

The second high-current busbar 123 is arranged spanning the rear surface of the side wall of the upper case 164 and the upper surface of the upper wall of the upper case 164. The end of the portion of the second high-current busbar 123 that is arranged on the upper surface of the upper wall of the upper case 164 is connected to the relay busbar 120A connected to the positive terminal 117 via the bolt 124.

Functions and Effects of the Present Embodiment

The following will describe functions and effects of the present embodiment. According to the present embodiment, the power storage module 110 is provided with the power storage unit 112 with the plurality of power storage elements 127, and the circuit unit 113 attached to the power storage unit 112. The circuit unit 113 includes: the high-current member 183 through which a composite current obtained from the plurality of power storage elements 127 flows; the low-current member 184 through which a detection current for detecting a state of the individual power storage elements 127 flows; and the lower case 163 and the upper case 164 that hold the high-current member 183 and the low-current member 184.

According to the present embodiment, the power storage unit 112 and the circuit unit 113 are combined into a single device, and the high-current member 183 and the low-current member 184 are held in one piece by the lower case 163 and the upper case 164, thus making it possible to downsize the power storage module 110 as a whole.

Furthermore, according to the present embodiment, the circuit unit is attached to the power storage unit along one face of the power storage unit and another face that extends from an edge of the one face. Accordingly, since the circuit unit 113 is arranged along one face and another face of the power storage unit, it is possible to further downsize the power storage module.

Furthermore, according to the present embodiment, the low-current member 184 is interposed between the power storage elements 127 and the high-current member 183.

Since a composite current flows through the power storage unit 112, and the high-current member 183 of the circuit unit 113, it is concerned that heat is generated due to the current flow, and the temperature of the casing 111 increases locally in the vicinity of the power storage unit 112 and the high-current member 183. According to the present embodiment, the low-current member 184 is interposed between the power storage elements 127 and the high-current member 183. Therefore, the power storage unit 112 and the high-current member 183 are arranged apart from each other, thus suppressing a local increase in the temperature of the casing 111.

Furthermore, according to the present embodiment, the circuit holding member includes: the insulating lower case 163 arranged covering a face of the power storage unit 112; and the insulating upper case 164 arranged covering a face of the lower case 163 opposite to its face covering the power storage unit 112. The first low-current busbars 167, the second low-current busbars 170, and the third low-current busbars 171 are arranged between the lower case 163 and the upper case 164. Accordingly, the first low-current busbars 167, the second low-current busbars 170, and the third low-current busbars 171 are reliably insulated by the lower case 163 and the upper case 164.

Furthermore, according to the present embodiment, the power storage unit 112 is provided with: the standby connector 159 connected to the low-current member 184; and the guide part 168 that is formed in the vicinity of the standby connector 159, and is configured to guide the circuit unit 113 to a true mounting position. Accordingly, it is possible to improve the work efficiency when assembling the power storage unit 112 and the circuit unit 113 together.

Furthermore, according to the present embodiment, the high-current member 183 includes the first high-current busbar 144 and the second high-current busbar 123, which serve as paths through which a composite current flows, and the relay 175 that switches supply and shutoff of a composite current. Accordingly, as a result of the relay 175 being incorporated as the circuit unit 113, the need of providing a separate electrical junction box with a relay 175 is eliminated. Accordingly, it is possible to arrange the components included in the power storage module 110 compactly as a whole.

The high-current member includes the first high-current busbar 144 serving as a path through which a composite current flows, and the high-current fuse 177 connected to the first high-current busbar 144. Accordingly, as a result of the high-current fuse 177 being incorporated as the circuit unit 113, the need of providing a separate fuse box in which a high-current fuse 177 is installed is eliminated. Accordingly, it is possible to arrange the components included in the power storage module 110 compactly as a whole. Moreover, it is possible to take overcurrent protection at a position close to the power storage unit 112.

Furthermore, according to the present embodiment, the circuit unit 113 includes the state detecting part 173 configured to detect a state of the power storage elements 127 upon input of a detection current flowing through the low-current member 184. Accordingly, it is possible to downsize the power storage module 110 as a whole compared to a case where a separate state detecting part 173 is provided.

OTHER EMBODIMENTS

The technique disclosed in the present description is not limited to the embodiment explained in the description and illustrated in the drawings, and the technical scope of the technique disclosed in the present description encompasses the following embodiments, for example.

According to the present embodiment, the power storage unit 112 is configured to include six power storage elements 127, but the present invention is not limited to this, and a configuration is also possible in which the power storage unit 112 includes two to five power storage elements 127, or seven or more power storage elements 127.

According to the present embodiment, each power storage element 127 has a configuration in which its power storage component is accommodated in a pair of laminate sheets, but the present invention is not limited to this, and the power storage element 127 may have such a shape that its power storage component is accommodated in a square tubular metal can or a circular tubular metal can, that is, any shape may be employed as appropriate.

According to the present embodiment, the circuit unit 113 is substantially L-shaped when viewed in the lateral direction, but the present invention is not limited to this, and the circuit unit 113 may also be flat box-shaped, that is, any shape may be employed as appropriate.

The present embodiment has a configuration in which the high-current member 183 is arranged on the side of the circuit unit 113 that faces away from the power storage unit 112, but the present invention is not limited to this, and a configuration is also possible in which the high-current member 183 is arranged on the same side of the circuit unit 113 as the power storage unit 112.

The present embodiment has a configuration in which the first low-current busbars 167, the second low-current busbars 170, and the third low-current busbars 171 are arranged between the lower case 163 and the upper case 164, but the present invention is not limited to this, and a configuration is also possible in which they are sandwiched between well-known insulating plates, that is, any configuration may be used as appropriate.

The guide parts 168 and the guide destination parts 169 may also be omitted.

The present embodiment has a configuration in which a detection current is extracted from the individual power storage elements 127, but a method may also be used in which a detection current is collectively extracted from the plurality of power storage elements 127 to detect a state of the power storage elements 127.

The present embodiment has a configuration in which the high-current member 183 and the low-current member 184 include busbars, but the present invention is not limited to this, and a configuration is also possible in which the high-current member 183 includes an electric wire, or the low-current member 184 includes an electric wire.

The high-current member 183 does not need to be incorporated as the power storage module 110, but may also be provided as a separate component.

The state detecting part 173 does not need to be incorporated as the power storage module 110, but may also be provided as a separate component.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

110: Power storage module
112: Power storage unit
113: Circuit unit
111: Casing
114: Case
115: Lid
123: Second high-current busbar
127: Power storage element
144: First high-current busbar
159: Standby connector
163: Lower case
164: Upper case
165: Circuit unit-side connector
167: First low-current busbar
168: Guide part
170: Second low-current busbar
171: Third low-current busbar
173: State detecting part
175: Relay
177: High-current fuse
183: High-current member
184: Low-current member

The invention claimed is:

1. A power storage module comprising:
a power storage unit with a plurality of power storage elements; and
a circuit unit attached to the power storage unit,
wherein the circuit unit is attached to the power storage unit along a first face of the power storage unit and a second face of the power storage unit that extends from an edge of the first face of the power storage unit;
the circuit unit includes:
　a high-current member through which a composite current obtained from the plurality of power storage elements flows;
　a low-current member through which a detection current for detecting a state of the individual power storage elements flows; and
　a circuit holding member that holds the high-current member and the low-current member, the circuit holding member includes:
　　an insulating first case including a side wall arranged to cover the first face of the power storage unit and an upper wall arranged to cover the second face of the power storage unit, and
　　an insulating second case arranged to cover a side of the side wall that is opposite to a side of the side wall covering the power storage unit and to cover a side of the upper wall that is opposite to a side of the upper wall covering the power storage unit; and
　the low-current member is arranged between the insulating first case and the insulating second case.

2. The power storage module according to claim 1, wherein the low-current member is interposed between the power storage elements and the high-current member.

3. The power storage module according to claim 1, wherein the power storage unit is provided with:
　a standby connection part connected to the low-current member; and
　a guide part that is formed in the vicinity of the standby connection part, and is configured to guide the circuit unit to a true mounting position.

4. The power storage module according to claim 1, wherein the high-current member includes a high current path serving as a path through which the composite current flows, and a relay configured to switch supply and shutoff of the composite current.

5. The power storage module according to claim 1, wherein the high-current member includes a high current path serving as a path through which the composite current flows, and a fuse connected to the high current path.

6. The power storage module according to claim 1, wherein the circuit unit includes a state detecting part configured to detect a state of the power storage elements upon input of a detection current flowing through the low-current member.

* * * * *